US012597772B2

(12) United States Patent
Elbsat

(10) Patent No.: US 12,597,772 B2
(45) Date of Patent: *Apr. 7, 2026

(54) CENTRAL PLANT CONTROL SYSTEM WITH ASSET ALLOCATION OVERRIDE

(71) Applicant: Johnson Controls Tyco IP Holdings LLP, Milwaukee, WI (US)

(72) Inventor: Mohammad N. Elbsat, Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 257 days.

This patent is subject to a terminal disclaimer.

(21) Appl. No.: 18/198,091

(22) Filed: May 16, 2023

(65) Prior Publication Data

US 2023/0291202 A1 Sep. 14, 2023

Related U.S. Application Data

(63) Continuation-in-part of application No. 17/688,192, filed on Mar. 7, 2022, now Pat. No. 11,689,384, and
(Continued)

(51) Int. Cl.
*H02J 3/00* (2006.01)
*G05B 15/02* (2006.01)
(Continued)

(52) U.S. Cl.
CPC .............. *H02J 3/003* (2020.01); *G05B 15/02* (2013.01); *G05B 19/042* (2013.01);
(Continued)

(58) Field of Classification Search
CPC ...... H02J 3/003; H02J 3/32; H02J 3/38; H02J 3/381; H02J 3/40; H02J 2203/20;
(Continued)

(56) References Cited

U.S. PATENT DOCUMENTS 3,913,829 A 10/1975 Fink
5,301,109 A 4/1994 Landauer et al.
(Continued)

FOREIGN PATENT DOCUMENTS

CA 2957726 A1 3/2016
CA 3043996 A1 2/2018
(Continued)

OTHER PUBLICATIONS

Afram et al., "Theory and Application of HVAC Control Systems—A review of Model Predictive Control (MPC)," Building and Environment, Feb. 2014, vol. 72 (pp. 343-355).
(Continued)

*Primary Examiner* — Zhipeng Wang
(74) *Attorney, Agent, or Firm* — Foley & Lardner LLP

(57) ABSTRACT

A controller for building equipment that operate to produce or consume resources for a building or campus. The controller performs an optimization of an objective function subject to an override constraint to determine values for a plurality of decision variables indicating amounts of resources to be produced or consumed by the building equipment. The override constraint defines one or more of the values for a subset of the plurality of decision variables by specifying an override amount of a first resource of the resources to be produced or consumed by a first subset of the building equipment and the optimization determines a remainder of the values for a remainder of the plurality of decision variables. The controller controls the building equipment to produce or consume the amounts of the resources determined by performing the optimization subject to the override constraint.

20 Claims, 10 Drawing Sheets

Related U.S. Application Data a continuation-in-part of application No. 17/330,741, filed on May 26, 2021, now Pat. No. 11,699,903, said application No. 17/688,192 is a continuation of application No. 16/684,371, filed on Nov. 14, 2019, now Pat. No. 11,271,769, said application No. 17/330,741 is a continuation of application No. 15/974,443, filed on May 8, 2018, now Pat. No. 11,022,947, which is a continuation-in-part of application No. 15/616,616, filed on Jun. 7, 2017, now Pat. No. 10,949,777.

(51) Int. Cl.

| | |
|---|---|
| *G05B 19/042* | (2006.01) |
| *G06Q 30/0207* | (2023.01) |
| *G06Q 50/06* | (2012.01) |
| *H02J 3/32* | (2006.01) |
| *H02J 3/38* | (2006.01) |
| *H02J 3/40* | (2006.01) |

(52) U.S. Cl.
CPC ......... *G06Q 30/0236* (2013.01); *G06Q 50/06* (2013.01); *G05B 2219/2639* (2013.01); *H02J 3/32* (2013.01); *H02J 3/38* (2013.01); *H02J 3/381* (2013.01); *H02J 3/40* (2013.01); *H02J 2203/20* (2020.01); *H02J 2300/24* (2020.01)

(58) Field of Classification Search
CPC ............... H02J 2300/24; H02J 2310/12; H02J 2310/14; H02J 3/008; H02J 3/14; G05B 15/02; G05B 19/042; G05B 2219/2639; G05B 2219/2642; G06Q 30/0236; G06Q 50/06; G06Q 10/04; Y02B 70/30; Y02B 70/3225; Y04S 20/222; Y04S 20/242; Y04S 20/244; Y04S 50/10
See application file for complete search history.

(56) References Cited

U.S. PATENT DOCUMENTS

| | | | |
|---|---|---|---|
| 5,311,123 A | 5/1994 | Webster et al. |
| 5,347,466 A | 9/1994 | Nichols |
| 5,377,308 A | 12/1994 | Inoue et al. |
| 5,446,677 A | 8/1995 | Jensen et al. |
| 5,461,570 A | 10/1995 | Wang et al. |
| 5,581,478 A | 12/1996 | Cruse et al. |
| 5,732,193 A | 3/1998 | Aberson |
| 5,737,215 A | 4/1998 | Schricker et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,041,287 A | 3/2000 | Dister et al. |
| 6,111,643 A | 8/2000 | Discenzo |
| 6,119,074 A | 9/2000 | Sarangapani |
| 6,134,511 A | 10/2000 | Subbarao |
| 6,157,943 A | 12/2000 | Meyer |
| 6,262,550 B1 | 7/2001 | Kliman et al. |
| 6,285,966 B1 | 9/2001 | Brown et al. |
| 6,298,308 B1 | 10/2001 | Reid et al. |
| 6,326,758 B1 | 12/2001 | Discenzo |
| 6,341,266 B1 | 1/2002 | Braun |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,434,512 B1 | 8/2002 | Discenzo |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,626,366 B2 | 9/2003 | Kayahara et al. |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,062,361 B1 | 6/2006 | Lane |
| 7,085,615 B2 | 8/2006 | Persson et al. |
| 7,206,644 B2 | 4/2007 | Iino et al. |
| 7,401,057 B2 | 7/2008 | Eder |
| 7,457,762 B2 | 11/2008 | Wetzer et al. |
| 7,552,467 B2 | 6/2009 | Lindsay |
| 7,580,775 B2 | 8/2009 | Kulyk et al. |
| 7,627,493 B1 | 12/2009 | Sarthi |
| 7,627,544 B2 | 12/2009 | Chkodrov et al. |
| 7,818,249 B2 | 10/2010 | Lovejoy et al. |
| 7,860,737 B2 | 12/2010 | Jordan et al. |
| 7,889,051 B1 | 2/2011 | Billig et al. |
| 7,894,946 B2 | 2/2011 | Kulyk et al. |
| 7,966,214 B2 | 6/2011 | Denton |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,126,574 B2 | 2/2012 | Discenzo et al. |
| 8,155,900 B1 | 4/2012 | Adams |
| 8,229,470 B1 | 7/2012 | Ranjan et al. |
| 8,396,571 B2 | 3/2013 | Costiner et al. |
| 8,401,991 B2 | 3/2013 | Wu et al. |
| 8,495,745 B1 | 7/2013 | Schrecker et al. |
| 8,516,016 B2 | 8/2013 | Park et al. |
| 8,527,108 B2 | 9/2013 | Kulyk et al. |
| 8,527,109 B2 | 9/2013 | Kulyk et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,762,942 B2 | 6/2014 | Langworthy et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,880,962 B2 | 11/2014 | Hosking et al. |
| 8,903,554 B2 | 12/2014 | Stagner |
| 8,918,223 B2 | 12/2014 | Kulyk et al. |
| 8,941,465 B2 | 1/2015 | Pineau et al. |
| 8,990,127 B2 | 3/2015 | Taylor |
| 9,058,568 B2 | 6/2015 | Hosking et al. |
| 9,058,569 B2 | 6/2015 | Hosking et al. |
| 9,070,113 B2 | 6/2015 | Shafiee et al. |
| 9,110,647 B2 | 8/2015 | Kulyk et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,235,847 B2 | 1/2016 | Greene et al. |
| 9,286,582 B2 | 3/2016 | Drees et al. |
| 9,311,807 B2 | 4/2016 | Schultz et al. |
| 9,344,751 B1 | 5/2016 | Ream et al. |
| 9,354,968 B2 | 5/2016 | Wenzel et al. |
| 9,424,693 B2 | 8/2016 | Rodrigues |
| 9,429,923 B2 | 8/2016 | Ward et al. |
| 9,447,985 B2 | 9/2016 | Johnson |
| 9,507,686 B2 | 11/2016 | Horn et al. |
| 9,514,577 B2 | 12/2016 | Ahn et al. |
| 9,524,594 B2 | 12/2016 | Ouyang et al. |

(56) References Cited

U.S. PATENT DOCUMENTS

| | | |
|---|---|---|
| 9,558,196 B2 | 1/2017 | Johnston et al. |
| 9,652,813 B2 | 5/2017 | Gifford et al. |
| 9,703,339 B2 | 7/2017 | Kulyk et al. |
| 9,740,545 B2 | 8/2017 | Aisu et al. |
| 9,753,455 B2 | 9/2017 | Drees |
| 9,760,068 B2 | 9/2017 | Harkonen et al. |
| 9,811,249 B2 | 11/2017 | Chen et al. |
| 9,838,844 B2 | 12/2017 | Emeis et al. |
| 9,886,478 B2 | 2/2018 | Mukherjee |
| 9,948,359 B2 | 4/2018 | Horton |
| 10,055,114 B2 | 8/2018 | Shah et al. |
| 10,055,206 B2 | 8/2018 | Park et al. |
| 10,101,731 B2 | 10/2018 | Asmus et al. |
| 10,116,461 B2 | 10/2018 | Fairweather et al. |
| 10,139,877 B2 | 11/2018 | Kulyk et al. |
| 10,169,454 B2 | 1/2019 | Ait-Mokhtar et al. |
| 10,171,586 B2 | 1/2019 | Shaashua et al. |
| 10,187,258 B2 | 1/2019 | Nagesh et al. |
| 10,190,793 B2 | 1/2019 | Drees et al. |
| 10,250,039 B2 | 4/2019 | Wenzel et al. |
| 10,438,303 B2 | 10/2019 | Chen et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,705,492 B2 | 7/2020 | Harvey |
| 10,708,078 B2 | 7/2020 | Harvey |
| 10,719,789 B1 | 7/2020 | Hoff |
| 10,845,771 B2 | 11/2020 | Harvey |
| 10,854,194 B2 | 12/2020 | Park et al. |
| 10,862,928 B1 | 12/2020 | Badawy et al. |
| 10,871,756 B2 | 12/2020 | Johnson et al. |
| 10,908,578 B2 | 2/2021 | Johnson et al. |
| 10,921,760 B2 | 2/2021 | Harvey |
| 10,921,768 B2 | 2/2021 | Johnson et al. |
| 10,921,972 B2 | 2/2021 | Park et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,156,978 B2 | 10/2021 | Johnson et al. |
| 11,229,138 B1 | 1/2022 | Harvey et al. |
| 11,314,726 B2 | 4/2022 | Park et al. |
| 11,314,788 B2 | 4/2022 | Park et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0055798 A1 | 3/2003 | Hittle et al. |
| 2003/0061004 A1 | 3/2003 | Discenzo |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0030520 A1 | 2/2004 | Matter |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0236248 A1 | 10/2006 | Eischeid et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0084502 A1 | 4/2007 | Kelly et al. |
| 2007/0203693 A1 | 8/2007 | Estes |
| 2007/0208682 A1 | 9/2007 | Mancisidor et al. |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0094230 A1 | 4/2008 | Mock et al. |
| 2008/0097816 A1 | 4/2008 | Freire et al. |
| 2008/0167756 A1 | 7/2008 | Golden et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2009/0204267 A1 | 8/2009 | Sustaeta et al. |
| 2009/0240381 A1 | 9/2009 | Lane |
| 2010/0045439 A1 | 2/2010 | Tak et al. |
| 2010/0058248 A1 | 3/2010 | Park |
| 2010/0114799 A1* | 5/2010 | Black .................... G06Q 50/06 |
| | | 705/412 |
| 2010/0131533 A1 | 5/2010 | Ortiz |
| 2010/0198420 A1 | 8/2010 | Rettger et al. |
| 2010/0241285 A1 | 9/2010 | Johnson et al. |
| 2010/0262298 A1 | 10/2010 | Johnson et al. |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0009996 A1 | 1/2011 | Liu et al. |
| 2011/0015802 A1 | 1/2011 | Imes |
| 2011/0018502 A1 | 1/2011 | Bianciotto et al. |
| 2011/0047418 A1 | 2/2011 | Drees et al. |
| 2011/0061015 A1 | 3/2011 | Drees et al. |
| 2011/0066258 A1 | 3/2011 | Torzhkov et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0164039 A1 | 7/2011 | Anklam |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0231320 A1 | 9/2011 | Irving |
| 2012/0011126 A1 | 1/2012 | Park et al. |
| 2012/0011141 A1 | 1/2012 | Park et al. |
| 2012/0022698 A1 | 1/2012 | Mackay |
| 2012/0036250 A1 | 2/2012 | Vaswani et al. |
| 2012/0047891 A1 | 3/2012 | Rosenfeld |
| 2012/0062577 A1 | 3/2012 | Nixon |
| 2012/0064923 A1 | 3/2012 | Imes et al. |
| 2012/0083927 A1 | 4/2012 | Nakamura et al. |
| 2012/0083930 A1 | 4/2012 | Ilic et al. |
| 2012/0092180 A1 | 4/2012 | Rikkola et al. |
| 2012/0100825 A1 | 4/2012 | Sherman et al. |
| 2012/0101637 A1 | 4/2012 | Imes et al. |
| 2012/0130556 A1 | 5/2012 | Marhoefer |
| 2012/0135759 A1 | 5/2012 | Imes et al. |
| 2012/0136485 A1 | 5/2012 | Weber et al. |
| 2012/0158350 A1 | 6/2012 | Steinberg et al. |
| 2012/0158633 A1 | 6/2012 | Eder |
| 2012/0245968 A1 | 9/2012 | Beaulieu et al. |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2012/0296480 A1 | 11/2012 | Raman et al. |

(56)         References Cited

U.S. PATENT DOCUMENTS

| | | |
|---|---|---|
| 2012/0310418 A1 | 12/2012 | Harrod et al. |
| 2012/0310560 A1 | 12/2012 | Ozaki |
| 2012/0310860 A1 | 12/2012 | Kim et al. |
| 2012/0330626 A1 | 12/2012 | An et al. |
| 2013/0007063 A1 | 1/2013 | Kalra et al. |
| 2013/0010348 A1 | 1/2013 | Massard et al. |
| 2013/0020443 A1 | 1/2013 | Dyckrup et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0103481 A1 | 4/2013 | Carpenter et al. |
| 2013/0167035 A1 | 6/2013 | Imes et al. |
| 2013/0170710 A1 | 7/2013 | Kuoch et al. |
| 2013/0204443 A1* | 8/2013 | Steven .................. G05B 13/04 |
| | | 700/286 |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0262035 A1 | 10/2013 | Mills |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2014/0032506 A1 | 1/2014 | Hoey et al. |
| 2014/0039709 A1 | 2/2014 | Steven et al. |
| 2014/0059483 A1 | 2/2014 | Mairs et al. |
| 2014/0067151 A1 | 3/2014 | Erhart et al. |
| 2014/0081652 A1 | 3/2014 | Klindworth |
| 2014/0135952 A1 | 5/2014 | Maehara |
| 2014/0152651 A1 | 6/2014 | Chen et al. |
| 2014/0163759 A1 | 6/2014 | Anderson et al. |
| 2014/0172184 A1 | 6/2014 | Schmidt et al. |
| 2014/0189861 A1 | 7/2014 | Gupta et al. |
| 2014/0201018 A1 | 7/2014 | Chassin |
| 2014/0207282 A1 | 7/2014 | Angle et al. |
| 2014/0244051 A1 | 8/2014 | Rollins et al. |
| 2014/0249876 A1 | 9/2014 | Wu et al. |
| 2014/0257526 A1 | 9/2014 | Tiwari et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0277769 A1* | 9/2014 | Matsuoka .............. F24F 11/523 |
| | | 700/278 |
| 2014/0278461 A1 | 9/2014 | Artz |
| 2014/0316973 A1 | 10/2014 | Steven et al. |
| 2014/0327555 A1 | 11/2014 | Sager et al. |
| 2015/0008884 A1 | 1/2015 | Waki et al. |
| 2015/0019174 A1 | 1/2015 | Kiff et al. |
| 2015/0042240 A1 | 2/2015 | Aggarwal et al. |
| 2015/0088576 A1 | 3/2015 | Steven et al. |
| 2015/0105917 A1 | 4/2015 | Sasaki et al. |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0256549 A1 | 9/2015 | Spurlock et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0309495 A1 | 10/2015 | Delorme et al. |
| 2015/0311713 A1 | 10/2015 | Asghari et al. |
| 2015/0316902 A1 | 11/2015 | Wenzel et al. |
| 2015/0316907 A1 | 11/2015 | Elbsat et al. |
| 2015/0316918 A1 | 11/2015 | Schleiss et al. |
| 2015/0316946 A1* | 11/2015 | Wenzel .................. G05B 15/02 |
| 2015/0324422 A1 | 11/2015 | Elder |
| 2015/0331689 A1 | 11/2015 | Blahaerath et al. |
| 2015/0341212 A1 | 11/2015 | Hsiao et al. |
| 2015/0348417 A1 | 12/2015 | Ignaczak et al. |
| 2015/0371328 A1* | 12/2015 | Gabel .................... G06Q 50/06 |
| | | 705/37 |
| 2015/0379080 A1 | 12/2015 | Jochimski |
| 2016/0011753 A1 | 1/2016 | Mcfarland et al. |
| 2016/0020608 A1 | 1/2016 | Carrasco et al. |
| 2016/0033946 A1 | 2/2016 | Zhu et al. |
| 2016/0035246 A1 | 2/2016 | Curtis |
| 2016/0043550 A1 | 2/2016 | Sharma et al. |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0092986 A1 | 3/2016 | Lian et al. |
| 2016/0102881 A1 | 4/2016 | Kim et al. |
| 2016/0119434 A1 | 4/2016 | Dong et al. |
| 2016/0127712 A1 | 5/2016 | Alfredsson et al. |
| 2016/0139752 A1 | 5/2016 | Shim et al. |
| 2016/0148137 A1 | 5/2016 | Phan et al. |
| 2016/0148171 A1 | 5/2016 | Phan et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0187911 A1 | 6/2016 | Carty et al. |
| 2016/0195856 A1 | 7/2016 | Spero |
| 2016/0212165 A1 | 7/2016 | Singla et al. |
| 2016/0216722 A1 | 7/2016 | Tokunaga et al. |
| 2016/0232549 A1* | 8/2016 | Guenette ............ G06Q 30/0207 |
| 2016/0239660 A1 | 8/2016 | Azvine et al. |
| 2016/0239756 A1 | 8/2016 | Aggour et al. |
| 2016/0275630 A1 | 9/2016 | Strelec et al. |
| 2016/0281607 A1 | 9/2016 | Asati et al. |
| 2016/0305678 A1 | 10/2016 | Pavlovski et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0329708 A1 | 11/2016 | Day |
| 2016/0350080 A1 | 12/2016 | Ravindran et al. |
| 2016/0350364 A1 | 12/2016 | Anicic et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0363948 A1 | 12/2016 | Steven et al. |
| 2016/0370258 A1 | 12/2016 | Perez |
| 2016/0373453 A1 | 12/2016 | Ruffner et al. |
| 2016/0377306 A1 | 12/2016 | Drees et al. |
| 2016/0378306 A1 | 12/2016 | Kresl et al. |
| 2016/0379149 A1 | 12/2016 | Saito et al. |
| 2016/0379326 A1 | 12/2016 | Chan-Gove et al. |
| 2017/0003667 A1 | 1/2017 | Nakabayashi et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0031962 A1 | 2/2017 | Turney et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0083822 A1 | 3/2017 | Adendorff et al. |
| 2017/0084168 A1 | 3/2017 | Janchookiat |
| 2017/0090437 A1 | 3/2017 | Veeramani et al. |
| 2017/0093700 A1 | 3/2017 | Gilley et al. |
| 2017/0097647 A1 | 4/2017 | Lunani et al. |
| 2017/0098086 A1 | 4/2017 | Hoernecke et al. |

(56)                References Cited

U.S. PATENT DOCUMENTS

| 2017/0102162 | A1 | 4/2017 | Drees et al. |
| 2017/0102433 | A1 | 4/2017 | Wenzel et al. |
| 2017/0102434 | A1 | 4/2017 | Wenzel et al. |
| 2017/0102675 | A1 | 4/2017 | Drees |
| 2017/0103327 | A1 | 4/2017 | Penilla et al. |
| 2017/0103403 | A1 | 4/2017 | Chu et al. |
| 2017/0103483 | A1* | 4/2017 | Drees ............. G06Q 10/06315 |
| 2017/0104332 | A1 | 4/2017 | Wenzel et al. |
| 2017/0104336 | A1 | 4/2017 | Elbsat et al. |
| 2017/0104337 | A1 | 4/2017 | Drees |
| 2017/0104342 | A1 | 4/2017 | Elbsat et al. |
| 2017/0104343 | A1 | 4/2017 | Elbsat et al. |
| 2017/0104344 | A1 | 4/2017 | Wenzel et al. |
| 2017/0104345 | A1 | 4/2017 | Wenzel et al. |
| 2017/0104346 | A1 | 4/2017 | Wenzel et al. |
| 2017/0104449 | A1 | 4/2017 | Drees |
| 2017/0123389 | A1 | 5/2017 | Baez et al. |
| 2017/0134415 | A1 | 5/2017 | Muddu et al. |
| 2017/0167742 | A1 | 6/2017 | Radovanovic et al. |
| 2017/0177715 | A1 | 6/2017 | Chang et al. |
| 2017/0180147 | A1 | 6/2017 | Brandman et al. |
| 2017/0188216 | A1 | 6/2017 | Koskas et al. |
| 2017/0205818 | A1 | 7/2017 | Adendorff et al. |
| 2017/0212482 | A1 | 7/2017 | Boettcher et al. |
| 2017/0212488 | A1* | 7/2017 | Kummer ............. G05B 19/042 |
| 2017/0212668 | A1 | 7/2017 | Shah et al. |
| 2017/0220641 | A1 | 8/2017 | Chi et al. |
| 2017/0230930 | A1 | 8/2017 | Frey |
| 2017/0235817 | A1 | 8/2017 | Deodhar et al. |
| 2017/0236222 | A1* | 8/2017 | Chen ..................... G06Q 50/06 |
| | | | 705/7.35 |
| 2017/0251182 | A1 | 8/2017 | Siminoff et al. |
| 2017/0270124 | A1 | 9/2017 | Nagano et al. |
| 2017/0277769 | A1 | 9/2017 | Pasupathy et al. |
| 2017/0278003 | A1 | 9/2017 | Liu |
| 2017/0288455 | A1 | 10/2017 | Fife |
| 2017/0294132 | A1 | 10/2017 | Colmenares |
| 2017/0315522 | A1 | 11/2017 | Kwon et al. |
| 2017/0315697 | A1 | 11/2017 | Jacobson et al. |
| 2017/0322534 | A1 | 11/2017 | Sinha et al. |
| 2017/0323389 | A1 | 11/2017 | Vavrasek |
| 2017/0329289 | A1 | 11/2017 | Kohn et al. |
| 2017/0336770 | A1 | 11/2017 | Macmillan |
| 2017/0345287 | A1 | 11/2017 | Fuller et al. |
| 2017/0351957 | A1 | 12/2017 | Lecue et al. |
| 2017/0357225 | A1 | 12/2017 | Asp et al. |
| 2017/0357490 | A1 | 12/2017 | Park et al. |
| 2017/0357908 | A1 | 12/2017 | Cabadi et al. |
| 2017/0366414 | A1 | 12/2017 | Hamilton et al. |
| 2018/0012159 | A1 | 1/2018 | Kozloski et al. |
| 2018/0013579 | A1 | 1/2018 | Fairweather et al. |
| 2018/0024520 | A1 | 1/2018 | Sinha et al. |
| 2018/0039238 | A1 | 2/2018 | Gärtner et al. |
| 2018/0048485 | A1 | 2/2018 | Pelton et al. |
| 2018/0069932 | A1 | 3/2018 | Tiwari et al. |
| 2018/0082373 | A1 | 3/2018 | Hong et al. |
| 2018/0114140 | A1 | 4/2018 | Chen et al. |
| 2018/0137288 | A1 | 5/2018 | Polyakov |
| 2018/0157930 | A1 | 6/2018 | Rutschman et al. |
| 2018/0162400 | A1 | 6/2018 | Abdar |
| 2018/0176241 | A1 | 6/2018 | Manadhata et al. |
| 2018/0196456 | A1 | 7/2018 | Elbsat |
| 2018/0197253 | A1 | 7/2018 | Elbsat et al. |
| 2018/0198627 | A1 | 7/2018 | Mullins |
| 2018/0203961 | A1 | 7/2018 | Aisu et al. |
| 2018/0224814 | A1 | 8/2018 | Elbsat et al. |
| 2018/0239982 | A1 | 8/2018 | Rutschman et al. |
| 2018/0275625 | A1 | 9/2018 | Park et al. |
| 2018/0276962 | A1 | 9/2018 | Butler et al. |
| 2018/0285800 | A1 | 10/2018 | Wenzel et al. |
| 2018/0292797 | A1 | 10/2018 | Lamparter et al. |
| 2018/0336785 | A1 | 11/2018 | Ghannam et al. |
| 2018/0341255 | A1 | 11/2018 | Turney et al. |
| 2018/0356782 | A1 | 12/2018 | Elbsat et al. |
| 2018/0359111 | A1 | 12/2018 | Harvey |
| 2018/0364654 | A1 | 12/2018 | Locke et al. |
| 2018/0373234 | A1 | 12/2018 | Khalate et al. |
| 2019/0005025 | A1 | 1/2019 | Malabarba |
| 2019/0013023 | A1 | 1/2019 | Pourmohammad et al. |
| 2019/0025771 | A1 | 1/2019 | Park et al. |
| 2019/0037135 | A1 | 1/2019 | Hedge |
| 2019/0042988 | A1 | 2/2019 | Brown et al. |
| 2019/0066236 | A1 | 2/2019 | Wenzel |
| 2019/0072943 | A1 | 3/2019 | Przybylski |
| 2019/0088106 | A1 | 3/2019 | Grundstrom |
| 2019/0093556 | A1 | 3/2019 | Wagner et al. |
| 2019/0094824 | A1 | 3/2019 | Xie et al. |
| 2019/0096217 | A1 | 3/2019 | Pourmohammad et al. |
| 2019/0102840 | A1 | 4/2019 | Perl et al. |
| 2019/0129403 | A1 | 5/2019 | Turney et al. |
| 2019/0138512 | A1 | 5/2019 | Pourmohammad et al. |
| 2019/0147883 | A1 | 5/2019 | Mellenthin et al. |
| 2019/0158309 | A1 | 5/2019 | Park et al. |
| 2019/0163152 | A1 | 5/2019 | Worrall et al. |
| 2019/0268178 | A1 | 8/2019 | Fairweather et al. |
| 2019/0271978 | A1 | 9/2019 | Elbsat et al. |
| 2019/0310979 | A1 | 10/2019 | Masuzaki et al. |
| 2019/0325368 | A1 | 10/2019 | Turney et al. |
| 2019/0338972 | A1 | 11/2019 | Schuster et al. |
| 2020/0019129 | A1 | 1/2020 | Sircar et al. |
| 2020/0226156 | A1 | 7/2020 | Borra et al. |
| 2020/0284458 | A1 | 9/2020 | Yoshida et al. |
| 2020/0285203 | A1 | 9/2020 | Thakur et al. |
| 2021/0042299 | A1 | 2/2021 | Migliori |
| 2021/0381711 | A1 | 12/2021 | Harvey et al. |
| 2021/0381712 | A1 | 12/2021 | Harvey et al. |
| 2021/0382445 | A1 | 12/2021 | Harvey et al. |
| 2021/0383041 | A1 | 12/2021 | Harvey et al. |
| 2021/0383042 | A1 | 12/2021 | Harvey et al. |
| 2021/0383200 | A1 | 12/2021 | Harvey et al. |
| 2021/0383219 | A1 | 12/2021 | Harvey et al. |
| 2021/0383235 | A1 | 12/2021 | Harvey et al. |
| 2021/0383236 | A1 | 12/2021 | Harvey et al. |
| 2022/0066402 | A1 | 3/2022 | Harvey et al. |
| 2022/0066405 | A1 | 3/2022 | Harvey |
| 2022/0066432 | A1 | 3/2022 | Harvey et al. |
| 2022/0066434 | A1 | 3/2022 | Harvey et al. |
| 2022/0066528 | A1 | 3/2022 | Harvey et al. |
| 2022/0066722 | A1 | 3/2022 | Harvey et al. |
| 2022/0066754 | A1 | 3/2022 | Harvey et al. |
| 2022/0066761 | A1 | 3/2022 | Harvey et al. |
| 2022/0067226 | A1 | 3/2022 | Harvey et al. |
| 2022/0067227 | A1 | 3/2022 | Harvey et al. |
| 2022/0067230 | A1 | 3/2022 | Harvey et al. |
| 2022/0069863 | A1 | 3/2022 | Harvey et al. |
| 2022/0070293 | A1 | 3/2022 | Harvey et al. |
| 2022/0138684 | A1 | 5/2022 | Harvey |
| 2022/0215264 | A1 | 7/2022 | Harvey et al. |
| 2023/0010757 | A1 | 1/2023 | Preciado |

FOREIGN PATENT DOCUMENTS

| CN | 101415011 | A | 4/2009 |
| CN | 102136099 | A | 7/2011 |
| CN | 102136100 | A | 7/2011 |
| CN | 102650876 | A | 8/2012 |
| CN | 103679357 | A | 3/2014 |
| CN | 104040583 | A | 9/2014 |
| CN | 104603832 | A | 5/2015 |
| CN | 104919484 | A | 9/2015 |
| CN | 105844367 | A | 8/2016 |
| CN | 106204392 | A | 12/2016 |
| CN | 106406806 | A | 2/2017 |
| CN | 106503842 | A | 3/2017 |
| CN | 106529769 | A | 3/2017 |
| CN | 106960269 | A | 7/2017 |
| CN | 107147639 | A1 | 9/2017 |
| CN | 107598928 | A | 1/2018 |
| EP | 1 156 286 | A2 | 11/2001 |
| EP | 2 528 033 | A1 | 11/2012 |
| EP | 2 344 959 | B1 | 5/2017 |
| EP | 3 186 687 | A4 | 7/2017 |
| EP | 3 324 306 | A1 | 5/2018 |
| EP | 3 497 377 | A1 | 6/2019 |

(56) References Cited

FOREIGN PATENT DOCUMENTS

| GB | 2 541 170 | A | 2/2017 |
| JP | H10-049552 | A | 2/1998 |
| JP | 2001-357112 | A | 12/2001 |
| JP | 2003-141178 | A | 5/2003 |
| JP | 2003-162573 | A | 6/2003 |
| JP | 2007-018322 | A | 1/2007 |
| JP | 4073946 | B1 | 4/2008 |
| JP | 2008-107930 | A | 5/2008 |
| JP | 2013-152618 | A | 8/2013 |
| JP | 2014-044457 | A | 3/2014 |
| JP | 6144346 | B2 | 6/2017 |
| KR | 2016/0102923 | A | 8/2016 |
| WO | WO-2009/020158 | A1 | 2/2009 |
| WO | WO-2011/100255 | A2 | 8/2011 |
| WO | WO-2012/161804 | A1 | 11/2012 |
| WO | WO-2013/050333 | A1 | 4/2013 |
| WO | WO-2013/130956 | A1 | 9/2013 |
| WO | WO-2015/106702 | A1 | 7/2015 |
| WO | WO-2015/145648 | A1 | 10/2015 |
| WO | WO-2016/144586 | A1 | 9/2016 |
| WO | WO-2017/007990 | A1 | 1/2017 |
| WO | WO-2017/035536 | A1 | 3/2017 |
| WO | WO-2017/192422 | A1 | 11/2017 |
| WO | WO-2017/194244 | A1 | 11/2017 |
| WO | WO-2017/205330 | A1 | 11/2017 |
| WO | WO-2017/213918 | A1 | 12/2017 |

OTHER PUBLICATIONS

Afram, A. et al., "Artificial Neural Network (ANN) Based Model Predictive Control (MPC) and Optimization of HVAC Systems: A State of the Art Review and Case Study of a Residential HVAC System", Energy and Buildings, Apr. 15, 2017, 141 (pp. 96-113).

Ahn et al., "Optimal Control Development for Chilled Water Plants Using a Quadratic Representation," Energy and Buildings, Apr. 2001, vol. 33, No. 4 (pp. 371-378).

Astrom, K., "Optimal Control of Markov Decision Processes with Incomplete State Estimation," J. Math. Anal. Appl., 1965, 10 (pp. 174-205).

Balaji et al., "Brick: Metadata schema for portable smart building applications," Applied Energy, 2018 (20 pages).

Balaji et al., "Brick: Metadata schema for portable smart building applications," Applied Energy, Sep. 15, 2018, 3 pages, (Abstract).

Balaji et al., "Demo Abstract: Portable Queries Using the Brick Schema for Building Applications," BuildSys '16, Palo Alto, CA, USA, Nov. 16-17, 2016 (2 pages).

Balaji, B. et al., "Brick: Towards a Unified Metadata Schema for Buildings." BuildSys '16, Palo Alto, CA, USA, Nov. 16-17, 2016 (10 pages).

Bhattacharya et al., "Short Paper: Analyzing Metadata Schemas for Buildings—The Good, The Bad and The Ugly," BuildSys '15, Seoul, South Korea, Nov. 4-5, 2015 (4 pages).

Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).

Bittanti, S. et al., Adaptive Control of Linear Time Invariant Systems: The "Bet on the Best" Principle, Communications in Information and Systems, 2006, 6.4, pp. 299-320.

Brick, "Brick Schema: Building Blocks for Smart Buildings," URL: chrome-extension://efaidnbmnnnibpcajpcglclefindmkaj/https://www.memoori.com/wp-content/uploads/2016/06/Brick_Schema_Whitepaper.pdf, Mar. 2019 (17 pages).

Brick, "Brick: Towards a Unified Metadata Schema For Buildings," URL: chrome-extension://efaidnbmnnnibpcajpcglclefindmkaj/https://brickschema.org/papers/Brick_BuildSys_Presentation.pdf, Presented at BuildSys '16, Nov. 2016 (46 pages).

Brick, "Metadata Schema for Buildings," URL: https://brickschema.org/docs/Brick-Leaflet.pdf, retrieved from internet Dec. 24, 2019 (3 pages).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Chen et al., "Control-oriented System Identification: an H1 Approach," Wiley-Interscience, 2000, 19, Chapters 3 & 8, 38 pages.

Chinese Office Action on CN Appl. Ser. No. 201780003995.9 dated Apr. 8, 2021 (21 pages).

Chinese Office action on CN Appl. Ser. No. 201780043400.2 dated Apr. 25, 2021 (15 pages).

CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Curry, E. et al., "Linking building data in the cloud: Integrating cross-domain building data using linked data." Advanced Engineering Informatics, 2013, 27 (pp. 206-219).

De Carlo, F. et al., "Maintenance Cost Optimization in Condition Based Maintenance: A Case Study for Critical Facilities", International Journal of Engineering and Technology, Oct.-Nov. 2013, 5.5 (pp. 4296-4302).

Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).

Digital Platform Litigation Documents Part 10, includes DDE-1-21-cv-01796 (documents filed Nov. 1, 2022-Dec. 22, 2021 (1795 pages total).

Digital Platform Litigation Documents Part 2, includes IPR2023-00085 (documents filed Oct. 20, 2022) (172 pages total).

Digital Platform Litigation Documents Part 3, includes IPR2023-00085 (documents filed Oct. 20, 2022) and IPR2023-00170 (documents filed Nov. 28, 2022-Nov. 7, 2022) (397 pages total).

Digital Platform Litigation Documents Part 4, includes IPR2023-00170 (documents filed Nov. 7, 2022) and IPR2023-00217 (documents filed Jan. 18, 2023-Nov. 15, 2022) (434 pages total).

Digital Platform Litigation Documents Part 5, includes IPR2023-00217 (documents filed Nov. 15, 2022) and IPR2023-00257 (documents filed Jan. 25, 2023-Nov. 23, 2022) (316 pages total).

Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).

Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).

Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).

Digital Platform Litigation Documents Part 9, includes DDE-1-21-cv-01796 (documents filed Jan. 10, 2023-Nov. 1, 2022 (203 pages total).

Drgona et al., "All you Need to Know about Model Predictive Control for Buildings," Annual Reviews in Control, 2020, vol. 50 (pp. 190-232).

El Kaed, C. et al., "Building management insights driven by a multi-system semantic representation approach," 2016 IEEE 3rd World Forum on Internet of Things (WF-IoT), Dec. 12-14, 2016, (pp. 520-525).

Ellis, C. et al., "Creating a room connectivity graph of a building from per-room sensor units." BuildSys '12, Toronto, ON, Canada, Nov. 6, 2012 (7 pages).

EP Extended European Search Reported on EP Appl. Ser. No. 18176474 dated Sep. 5, 2018 (8 pages).

EP Office Action on EP Appl. Ser. No. 18150740.1 dated Nov. 5, 2019 (6 pages).

(56)          References Cited

OTHER PUBLICATIONS

EP Office Action on EP Appl. Ser. No. 18176474.7 dated Feb. 10, 2020 (6 pages).
EP Office Action on EP Appl. Ser. No. 18176474.7 dated Sep. 11, 2019 (5 pages).
EP Office Action on EP Appl. Ser. No. 18190786.6 dated Feb. 5, 2020 (4 pages).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Extended European Search Report on EP Application No. 18196948.6 dated Apr. 10, 2019 (9 pages).
Feng, J. et al., "Model Predictive Control of Radiant Slab Systems with Evaporative Cooling Sources," Energy and Buildings, 2015, 87, pp. 199-210.
Fierro et al., "Beyond a House of Sticks: Formalizing Metadata Tags with Brick," BuildSys '19, New York, NY, USA, Nov. 13-14, 2019 (10 pages).
Fierro et al., "Dataset: An Open Dataset and Collection Tool for BMS Point Labels," DATA'19, New York, NY, USA, Nov. 10, 2019 (3 pages).
Fierro et al., "Design and Analysis of a Query Processor for Brick," ACM Transactions on Sensor Networks, Jan. 2018, vol. 1, No. 1, art. 1 (25 pages).
Fierro et al., "Design and Analysis of a Query Processor for Brick," BuildSys '17, Delft, Netherlands, Nov. 8-9, 2017 (10 pages).
Fierro et al., "Mortar: An Open Testbed for Portable Building Analytics," BuildSys '18, Shenzhen, China, Nov. 7-8, 2018 (10 pages).
Fierro et al., "Why Brick is a Game Changer for Smart Buildings," URL: https://brickschema.org/papers/Brick_Memoori_Webinar_Presentation.pdf, Memoori Webinar, 2019 (67 pages).
Fierro, "Writing Portable Building Analytics with the Brick Metadata Schema," UC Berkeley, ACM E-Energy, 2019 (39 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Chinese First Office Action on CN Appl. Ser. No. 201810586645.6, dated Apr. 6, 2021 (18 pages).
Gao et al., "A large-scale evaluation of automated metadata inference approaches on sensors from air handling units," Advanced Engineering Informatics, 2018, 37 (pp. 14-30).
George et al., "Time Series Analysis: Forecasting and Control", Fifth Edition, John Wiley & Sons, 2016, Chapters 4-7 and 13-15, 183 pages.
Hackner, J.R., "HVAC system dynamics and energy use in existing buildings," Doctoral Dissertation, University of Madison, Wisconsin, 1984 (174 pages).
Hardt, M. et al., "Gradient Descent Learns Linear Dynamical Systems", Journal of Machine Learning Research, 2018, 19, pp. 1-44.
Harvey, T., "Quantum Part 3: The Tools of Autonomy, How PassiveLogic's Quantum Creator and Autonomy Studio software works,"

URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Helmicki, A. et al. "Control Oriented System Identification: a Worst-case/deterministic Approach in H1," IEEE Transactions on Automatic Control, 1991, 36.10, pp. 1163-1176.
Hu, S. et al., "Building performance optimisation: A hybrid architecture for the integration of contextual information and time-series data," Automation in Construction, 2016, 70 (pp. 51-61).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on Appl. Ser. No. PCT/US2018/018039 dated Apr. 24, 2018 (14 pages).
International Search Report and Written Opinion on Appl. Ser. No. PCT/US2018/021288 dated Aug. 13, 2018 (20 pages).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052975, mailed Jan. 2, 2019, 13 pages.
International Search Report and Written Opinion on PCT/US2018/052994, mailed Jan. 7, 2019, 15 pages.
International Search Report and Written Opinion on PCT/US2019/015481, dated May 17, 2019, 15 pages.
International Search Report and Written Opinion on PCT/US2020/058381, dated Jan. 27, 2021, 30 pages.
Japanese Office Action on JP Appl. Ser. No. 2018-534963 dated May 11, 2021 (16 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-

(56)        References Cited

OTHER PUBLICATIONS

Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

Johnson, David, "Excel Rehabilitation Building Automation: Building Automation System User Manual," URL: http://cooljohnson.com/Building-Automation-Systems-Michigan/Waterford-Michigan/Building-Automation-System-Excel-Manual.html, 2012 (10 pages).

Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).

Kelman et al., "Analysis of Local Optima in Predictive Control for Energy Efficient Buildings," Journal of Building Performance Simulation, Apr. 16, 2012, vol. 6, No. 3 (pp. 236-255).

Kelman, A. et al., "Bilinear Model Predictive Control of a HVAC System Using Sequential Quadratic Programming", Proceedings of the IFAC World Congress, Sep. 2, 2011, 6 pages.

Kingma, D. et al., "Adam: A Method for Stochastic Optimization", International Conference on Learning Representations (ICLR), 2015, 15 pages.

Koehler et al., "Building Temperature Distributed Control via Explicit MPC and 'Trim and Respond' Methods," European Control Conference (ECC), Jul. 17-19, 2013, Zurich, Switzerland (pp. 4334-4339).

Koh et al., "Plaster: An Integration, Benchmark, and Development Framework for Metadata Normalization Methods," BuildSys '18, Shenzhen, China, Nov. 7-8, 2018 (10 pages).

Koh et al., "Scrabble: Transferrable Semi-Automated Semantic Metadata Normalization using Intermediate Representation," BuildSys '18, Shenzhen, China, Nov. 7-8, 2018 (10 pages).

Koh et al., "Who can Access What, and When?" BuildSys '19, New York, NY, USA, Nov. 13-14, 2019 (4 pages).

Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).

Lazic, N. et al., "Data center cooling using model-predictive control", 32nd Conference on Neural Information Processing Systems, 2018, 10 pages.

Li et al., "Event Stream Processing with Out-of-Order Data Arrival," International Conferences on Distributed Computing Systems, 2007, (8 pages).

Ljung (ed.), "System Identification: Theory for the User", 2nd Edition, Prentice Hall, Upper Saddle River, New Jersey, 1999, Chapters 5 and 7, 40 pages.

Ljung et al., "Theory and Practice of Recursive Identification," vol. 5. JSTOR, 1983, Chapters 2, 3 & 7, 80 pages.

Ma, Y. et al., "Model Predictive Control for the Operation of Building Cooling Systems", IEEE Transactions on Control Systems Technology, May 2012, 20:3, pp. 796-803.

Ma, Y. et al., "Predictive Control for Energy Efficient Buildings with Thermal Storage: Modeling, Stimulation, and Experiments", IEEE Control Systems, Feb. 2012, 32.1, pp. 44-64.

Mckenna et al., "A Trnsys model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).

Mohsenian-Rad, H. et al., "Smart Grid for Smart city Activities in the California City of Riverside," In: Alberto Leon-Garcia et al.: "Smart City 360°", Aug. 6, 2016, 22 Pages.

(56)          References Cited

OTHER PUBLICATIONS

Mossolly et al., "Optimal Control Strategy for a Multizone Air Conditioning System Using a Genetic Algorithm," Energy, Jan. 2009, vol. 34, No. 1 (pp. 58-66).

Nassif et al., "Optimization of HVAC Control System Strategy Using Two-Objective genetic Algorithm," International Journal of HVA C&R Research, vol. 11, No. 3 (pp. 459-486).

Nissin Electric Co., Ltd., "Smart power supply system (SPSS)," Outline of the scale verification plan, Nissin Electric Technical Report, Japan, Apr. 23, 2014, vol. 59, No. 1 (23 pages).

Passivelogic, "Explorer: Digital Twin Standard for Autonomous Systems. Made interactive." URL: https://passivelogic.com/software/quantum-explorer/, retrieved from internet Jan. 4, 2023 (13 pages).

Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).

PJM Economic Demand Resource in Energy Market, PJM State and Member Training Department, 2014, 119 pages.

PJM Manual 11: Energy & Ancillary Services Market Operations, pp. 122-137, PJM, 2015.

PJM Open Access Transmission Tariff, Section 3.3A, Apr. 4, 2016, 10 pages.

Protocol Buffer Basics, URL: https://developers.google.com/protocol-buffers/docs/csharptutorial, updated May 12, 2017, last updated May 12, 2017, retrieved from the internet Feb. 7, 2018, 8 pages.

Quantum Alliance, "Quantum Explorer Walkthrough," 2022, (7 pages) (screenshots from video).

Results of the Partial International Search for PCT/US2018/052971, dated Jan. 3, 2019, 3 pages.

Sinha, Sudhi and Al Huraimel, Khaled, "Reimagining Businesses with AI" John Wiley & Sons, Inc., Hoboken, NJ, USA, First ed. published 2020 (156 pages).

Sinha, Sudhi R. and Park, Youngchoon, "Building an Effective IoT Ecosystem for Your Business," Johnson Controls International, Springer International Publishing, 2017 (286 pages).

Sinha, Sudhi, "Making Big Data Work For Your Business: A guide to effective Big Data analytics," Impackt Publishing LTD., Birmingham, UK, Oct. 2014 (170 pages).

Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).

Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).

Strurznegger, D., "Model Predictive Building Climate Control, Steps Towards Practice," Doctoral Thesis, Automatic Control Laboratory, Zurich, Switzerland, 2014 (176 pages).

Sun et al., Optimal Control of Building HVAC&R Systems Using Complete Simulation-Based Sequential Quadratic Programming (CSB-SQP), Building and Environment, May 2005, vol. 40, No. 5 (pp. 657-669).

The Virtual Nuclear Tourist, "Calvert Cliffs Nuclear Power Plant," URL: http://www.nucleartourist.com/us/calvert.htm, Jan. 11, 2006 (2 pages).

Third Party Observation Report on EP Appl. Ser. No. 16165681.4 dated Jan. 15, 2020 (8 pages).

Third Party Observation Report on EP Appl. Ser. No. 16165681.4 dated Oct. 5, 2018 (6 pages).

University of California at Berkeley, EECS Department, "Enabling Scalable Smart-Building Analytics," URL: https://www2.eecs.berkeley.edu/Pubs/TechRpts/2016/EECS-2016-201.html, retrieved from internet Feb. 15, 2023 (7 pages).

Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).

Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).

Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).

Wang et al., "Model-Based Optimal Control of VAV Air-Conditioning System Using Genetic Algorithm," Building and Environment, Aug. 2000, vol. 35, No. 6 (pp. 471-487).

Wang et al., "Supervisory and Optimal Control of Building HVAC Systems: A Review," HVAC&R Research, Jan. 2008, vol. 14, No. 1 (pp. 3-32).

Wang, et al., "Research on Economic Demand Response Model in PJM Electric Market Considering the Error Uncertainty of CBL," Electric Power Construction, Oct. 2016, vol. 37, No. 10, 7 pages.

Ward, J. et al., "Beyond Comfort—Managing the Impact of HVAC Control on the Outside World", Proceedings of Conference: Air Conditioning and the Low Carbon Cooling Challenge, Cumberland Lodge, Windsor, UK, London: Network for Comfort and Energy Use in Buildings, http://nceub.org.uk, Jul. 27-29, 2008, 15 pages.

Wei et al., "Development and Implementation of Software Gateways of Fire Fighting Subsystem Running on EBI," Control, Automation and Systems Engineering, IITA International Conference on, IEEE, Jul. 2009 (pp. 9-12).

Wenzel, M. et al., "Autonomous Optimization and Control for Central Plants with Energy Storage," International High Performance Buildings Conference, 2016, paper 214, 11 pages.

Wenzel, M. et al., "Model Predictive Control for Central Plant Optimization with Thermal V Energy Storage," International High Performance Buildings Conference, 2014, paper 122, 11 pages.

Xi et al., "Support Vector Regression Model Predictive Control on a HVAC Plant," Control Engineering Practice, Aug. 2007, vol. 15, No. 8 (pp. 897-908).

Yao et al., "Global Optimization of a Central Air-Conditioning System Using Decomposition-Coordination Method," Energy and Buildings, May 2010, vol. 42, No. 5 (pp. 570-583).

Zhou, Q. et al., "Knowledge-infused and Consistent Complex Event Processing over Real-time and Persistent Streams," Further Generation Computer Systems, 2017, 76 (pp. 391-406).

* cited by examiner

700

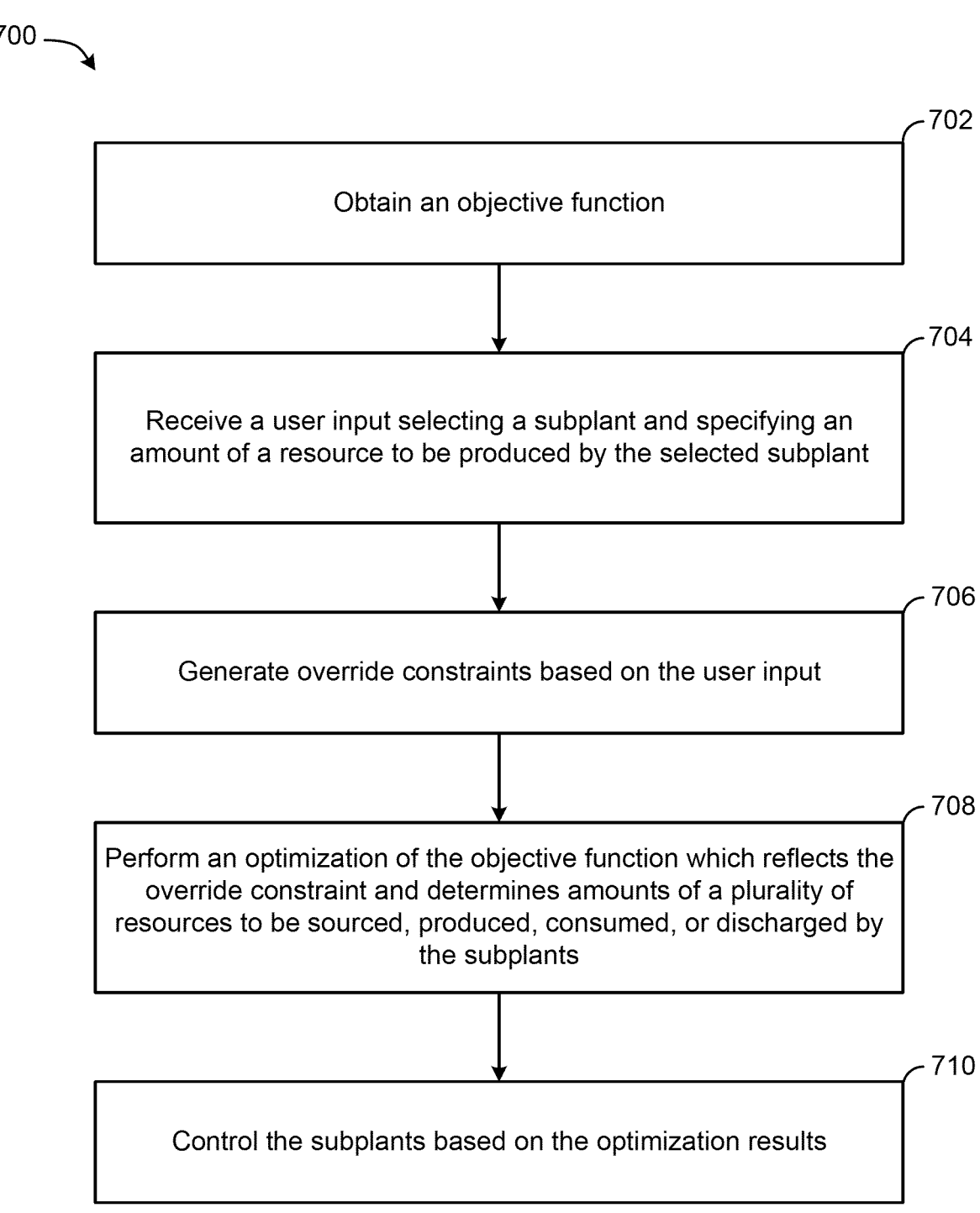

702

Obtain an objective function

704

Receive a user input selecting a subplant and specifying an amount of a resource to be produced by the selected subplant

706

Generate override constraints based on the user input

708

Perform an optimization of the objective function which reflects the override constraint and determines amounts of a plurality of resources to be sourced, produced, consumed, or discharged by the subplants

710

Control the subplants based on the optimization results

FIG. 7

CENTRAL PLANT CONTROL SYSTEM WITH ASSET ALLOCATION OVERRIDE

CROSS-REFERENCE TO RELATED PATENT APPLICATION

This application is a continuation-in-part of U.S. patent application Ser. No. 17/330,741, filed May 26, 2021, which is a continuation of U.S. patent application Ser. No. 15/974,443, filed May 8, 2018, which is a continuation-in-part of U.S. patent application Ser. No. 15/616,616, filed Jun. 7, 2017, the entire disclosures of which is incorporated by reference herein. This application is also a continuation-in-part of U.S. patent application Ser. No. 17/688,192, filed Mar. 7, 2022, which is a continuation of U.S. patent application Ser. No. 16/684,371 filed Nov. 14, 2019, the entire disclosures of which are incorporated by reference herein.

BACKGROUND

The present disclosure relates generally to a central plant or central energy facility configured to serve the energy loads of a building or campus. The present disclosure relates more particular to a central plant with an asset allocator configured to determine an optimal distribution of the energy loads across various subplants of the central plant.

A central plant typically includes multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

Some central plants include energy storage. Energy storage may be a tank of water that stores hot water for campus heating, an ice tank for campus cooling, and/or battery storage. In the presence of real-time pricing from utilities, it may be advantageous to manipulate the time that a certain resource or energy type is consumed. Instead of producing the resource exactly when it is required by the load, it can be optimal to produce that resource at a time when the production cost is low, store it, and then use it when the resource needed to produce that type of energy is more expensive. It can be difficult and challenging to optimally allocate the energy loads across the assets of the central plant.

SUMMARY

One implementation of the present disclosure is a controller for building equipment that operate to provide one or more resources to a building or campus. The controller includes a processing circuit configured to perform an optimization of an objective function subject to an override constraint to determine amounts of one or more resources to be produced by the building equipment and control the building equipment to produce the amounts of the one or more resources determined by performing the optimization subject to the override constraint. The override constraint overrides an output of the optimization by specifying an override amount of a first resource of the one or more resources to be produced by a first subset of the building equipment.

In some embodiments, the first subset of the building equipment and a second subset of the building equipment both operate to produce the first resource and contribute toward a total amount of the first resource required by the building or campus and the optimization is performed subject to both the override constraint and a second constraint that defines the total amount of the first resource required by the building or campus.

In some embodiments, performing the optimization subject to both the override constraint and the second constraint includes determining a second amount of the first resource to be produced by the second subset of the building equipment based on a difference between the total amount of the first resource required by the building or campus and the override amount of the first resource to be produced by the first subset of the building equipment.

In some embodiments, the objective function defines a total cost of operating the building equipment over a time period and optimizing the objective function includes determining amounts of the one or more resources to be produced by the building equipment that optimize the total cost.

In some embodiments, the objective function defines a total resource consumption of the building equipment over a time period and optimizing the objective function includes determining amounts of the one or more resources to be produced by the building equipment that optimize the total resource consumption.

In some embodiments, the optimization of the objective function subject to the override constraint is a first optimization and the processing circuit is configured to perform a second optimization of the objective function without the override constraint, calculate a difference between a first amount of resource consumption or cost resulting from the first optimization and a second amount of resource consumption or cost resulting from the second optimization, and present, via a user interface, an override impact indicating the difference between the first amount and the second amount.

In some embodiments, the processing circuit is configured to present, via the user interface, an option for a user to select whether to use the override constraint in view of the override impact, control the building equipment in accordance with a result of the first optimization in response to the user selecting to use the override constraint, and control the building equipment in accordance with a result of the second optimization in response to the user selecting to not use the override constraint.

In some embodiments, the override constraint requires at least one of an amount of the first resource produced by the first subset of building equipment to be equal to the override amount, or a difference between the amount of the first resource produced by the first subset of building equipment and the override amount to be less than a threshold value.

Another implementation of the present disclosure is a method for operating building equipment to provide one or more resources to a building or campus. The method includes receiving a user input specifying an override amount of a first resource to be produced by a first subset of the building equipment, generating an override constraint based on the user input, performing an optimization of an objective function subject to the override constraint to determine amounts of one or more resources, including the first resource, to be produced by the building equipment, and controlling the building equipment to produce the amounts of the one or more resources determined by performing the optimization subject to the override constraint. The override constraint overrides an output of the optimization.

In some embodiments, the first subset of the building equipment and a second subset of the building equipment both operate to produce the first resource and contribute toward a total amount of the first resource required by the building or campus and the optimization is performed subject to both the override constraint and a second constraint that defines the total amount of the first resource required by the building or campus.

In some embodiments, performing the optimization subject to both the override constraint and the second constraint includes determining a second amount of the first resource to be produced by the second subset of the building equipment based on a difference between the total amount of the first resource required by the building or campus and the override amount of the first resource to be produced by the first subset of the building equipment.

In some embodiments, the objective function defines a total cost of operating the building equipment over a time period and optimizing the objective function includes determining amounts of the one or more resources to be produced by the building equipment that optimize the total cost.

In some embodiments, the objective function defines a total resource consumption of the building equipment over a time period and optimizing the objective function includes determining amounts of the one or more resources to be produced by the building equipment that optimize the total resource consumption.

In some embodiments, the optimization of the objective function subject to the override constraint is a first optimization. The method further includes performing a second optimization of the objective function without the override constraint, calculating a difference between a first amount of resource consumption or cost resulting from the first optimization and a second amount of resource consumption or cost resulting from the second optimization, and presenting, via a user interface, an override impact indicating the difference between the first amount and the second amount.

In some embodiments, the method further includes presenting, via the user interface, an option for a user to select whether to use the override constraint in view of the override impact, controlling the building equipment in accordance with a result of the first optimization in response to the user selecting to use the override constraint, and controlling the building equipment in accordance with a result of the second optimization in response to the user selecting to not use the override constraint.

In some embodiments, the override constraint requires at least one of an amount of the first resource produced by the first subset of building equipment to be equal to the override amount or a difference between the amount of the first resource produced by the first subset of building equipment and the override amount to be less than a threshold value.

Another implementation of the present disclosure is a controller for building equipment that operate to provide one or more resources to a building or campus. The controller includes a processing circuit configured to perform a first optimization of an objective function to determine first amounts of one or more resources to be produced by the building equipment as a result of the first optimization receive a user input specifying an override amount of a first resource of the one or more resources to be produced by a first subset of the building equipment, perform a second optimization of the objective function, subject to an override constraint based on the user input, to determine second amounts of one or more resources to be produced by the building equipment as a result of the second optimization, and control the building equipment in accordance with the result of the first optimization or the result of the second optimization. The override constraint overrides a portion of the result of the first optimization.

In some embodiments, the processing circuit is configured to calculate a difference between a first amount of resource consumption or cost resulting from the first optimization result and a second amount of resource consumption or cost resulting from the second optimization and present, via a user interface, an override impact indicating the difference between the first amount and the second amount.

In some embodiments, the processing circuit is configured to present, via the user interface, an option for a user to select whether to use the override constraint in view of the override impact, control the building equipment in accordance with the result of the first optimization in response to the user selecting to not use the override constraint, and control the building equipment in accordance with the result of the second optimization in response to the user selecting to use the override constraint.

In some embodiments, the first subset of the building equipment and a second subset of the building equipment both operate to produce the first resource and contribute toward a total amount of the first resource required by the building or campus, the second optimization is performed subject to both the override constraint and a second constraint that defines the total amount of the first resource required by the building or campus, and performing the second optimization subject to both the override constraint and the second constraint includes determining a second amount of the first resource to be produced by the second subset of the building equipment based on a difference between the total amount of the first resource required by the building or campus and the override amount of the first resource to be produced by the first subset of the building equipment.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 7 is a flow diagram illustrating a method of optimizing a cost function to determine the allocation of assets and controlling subplants based on the results of the optimization, according to some embodiments.

DETAILED DESCRIPTION

Overview

Figure 1:
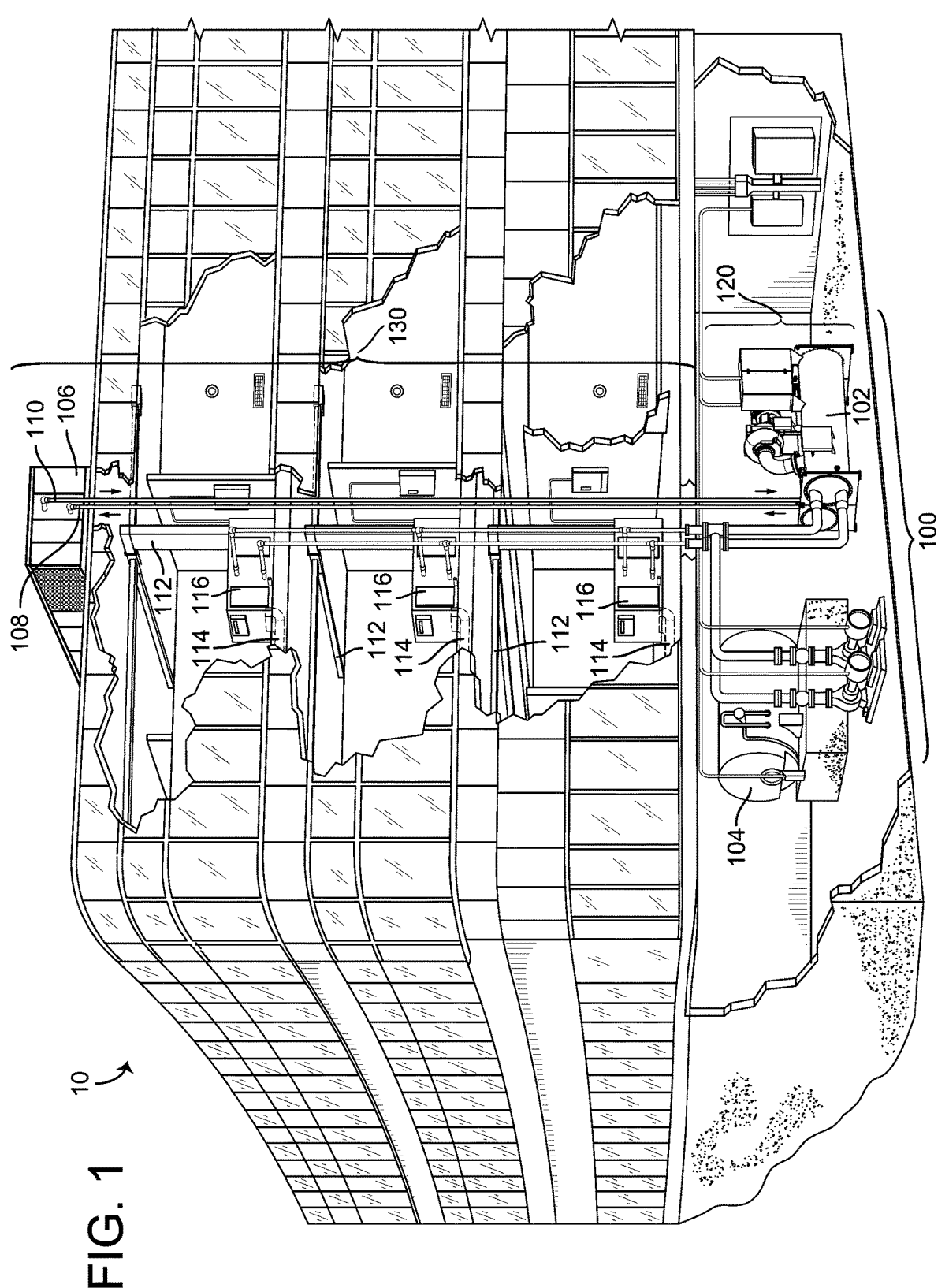
FIG. 1 is a drawing of a building equipped with a HVAC system, according to some embodiments.

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of energy loads (e.g., heating, cooling, electricity) across different subplants (i.e., equipment groups) of the central plant capable of producing that type of energy.

In some embodiments, the asset allocator can be configured to control the distribution, production, storage, and usage of resources in the central plant. The asset allocator can be configured to minimize the economic cost (or maximize the economic value) of operating the central plant over a duration of an optimization horizon. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs. In some embodiments, the asset allocator can be configured to minimize the resource consumption associated with operating the central plant over the duration of the optimization horizon. For example, asset allocator may be configured to minimize the total amount of each resource obtained from a plurality of sources over the duration of the optimization horizon, regardless of cost or price.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process to determine an optimal set of control decisions for each time step within the optimization horizon. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization horizon.

In some embodiments, the asset allocator may allow a user to override an amount of one or more resources produced or converted by one or more subplants. The asset allocator may perform an optimization process to determine an optimal set of control decisions, subject to the override amount provided by the user. In some embodiments, the asset allocator provides a cost impact associated with operating the central plant subject to the override. The cost impact may be the difference between a cost of operating the central plant subject to override and a cost of operating the central plant not subject to the override amount. In some embodiments, the user may be presented, via a user interface, with the cost impact as a dollar value. These and other features of the asset allocator are described in greater detail below.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
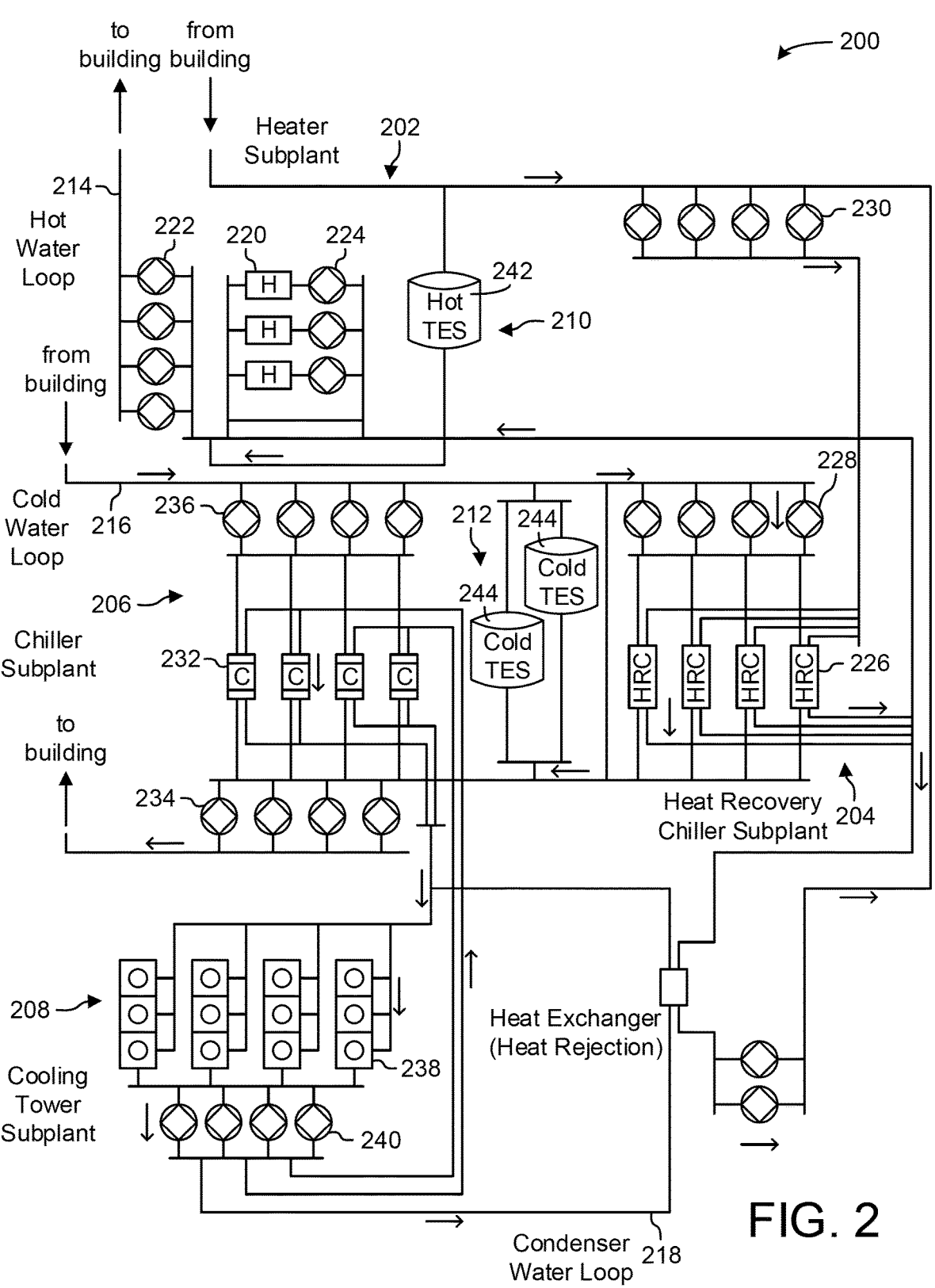
FIG. 2 is a block diagram of a central plant which can be used to serve the energy loads of the building of FIG. 1, according to some embodiments.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
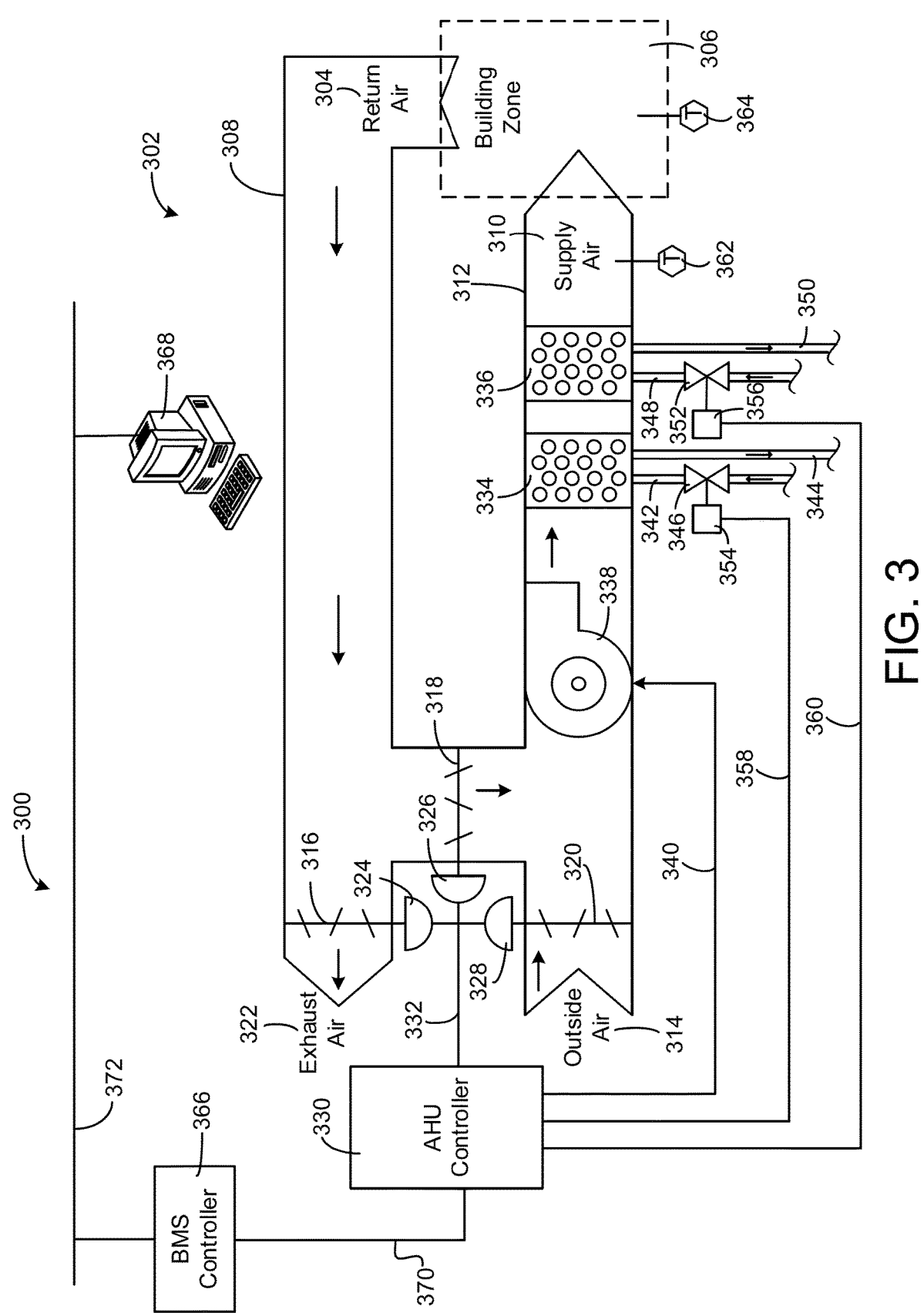
FIG. 3 is a block diagram of an airside system which can be implemented in the building of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
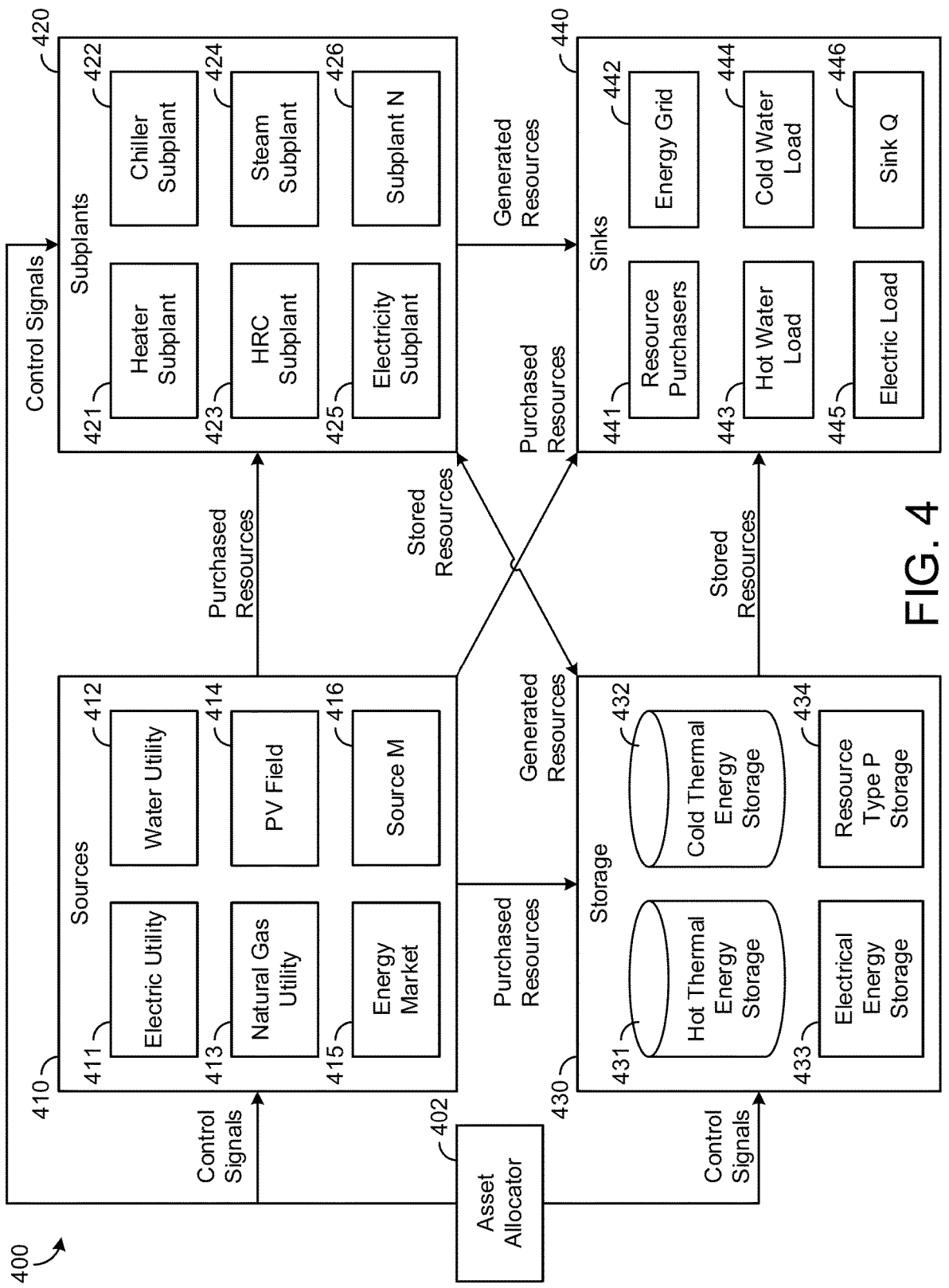
FIG. 4 is a block diagram of an asset allocation system including sources, subplants, storage, sinks, and an asset allocator configured to optimize the allocation of these assets, according to according to some embodiments.

Referring now to FIG. 4, a block diagram of an asset allocation system 400 is shown, according to an exemplary embodiment. Asset allocation system 400 can be configured to manage energy assets such as central plant equipment, battery storage, and other types of building equipment configured to serve the energy loads of a building. In some embodiments, building equipment can include equipment within a building or equipment within an off-site plant that operate to provide various resources to a building or campus. For example, building equipment may include batteries, thermal energy storage, chillers, hot water generators, combustion turbines, steam generators, electric generators, etc.

Asset allocation system 400 can determine an optimal distribution of heating, cooling, electricity, and energy loads across different subplants (i.e., building equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photo-voltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization horizon can be supplied as an input to asset allocation system 400 or predicted by asset allocation system 400. Sinks 440 can receive resources directly from sources 410, from subplants 420, and/or from storage 430.

Figure 5:
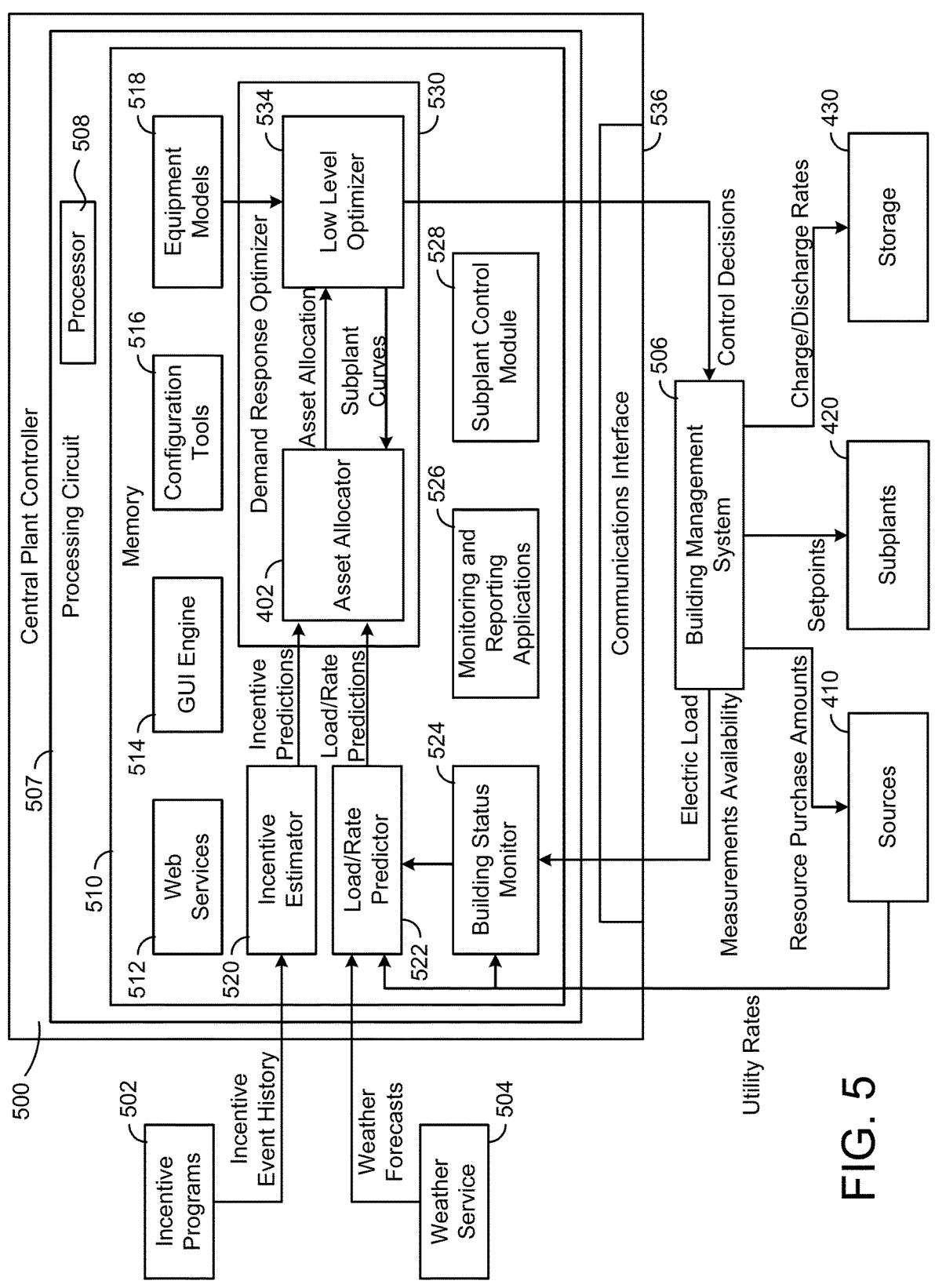
FIG. 5 is a block diagram of a central plant controller in which the asset allocator of FIG. 4 can be implemented, according to some embodiments.

Still referring to FIG. 4, asset allocation system 400 is shown to include an asset allocator 402. Asset allocator 402 can be implemented as part of a controller, computing system, cloud computing resource, etc., for example as shown in FIG. 5 and described with reference thereto. Asset allocator 402 may be configured to control the distribution, production, storage, and usage of resources in asset allocation system 400. In some embodiments, asset allocator 402 performs an optimization process determine an optimal set of control decisions for each time step within an optimization horizon. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization horizon of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization horizon. This resource balance is shown in the following equation:

$$\Sigma x_{time} = 0 \, \forall \text{ resources}, \forall \text{ time} \in \text{horizon}$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

In some embodiments, asset allocator 402 may be configured to minimize the economic cost (or maximize the economic value) of operating asset allocation system 400 over the duration of the optimization horizon. The economic cost may be defined by a cost function $J(x)$ that expresses economic cost as a function of the control decisions made by asset allocator 402. The cost function $J(x)$ may account for the cost of resources purchased from sources 410, as well as the revenue generated by selling resources to resource purchasers 441 or energy grid 442 or participating in incentive programs. The cost optimization performed by asset allocator 402 can be expressed as:

$$\operatorname*{argmin}_{x} J(x)$$

where $J(x)$ is defined as follows:

$$J(x) = \sum_{sources} \sum_{horizon} \mathrm{cost}\big(\mathrm{purchase}_{resource,time}, \, time\big) -$$
$$\sum_{incentives} \sum_{horizon} \mathrm{revenue}(ReservationAmount)$$

The first term in the cost function $J(x)$ represents the total cost of all resources purchased over the optimization horizon. Resources can include, for example, water, electricity, natural gas, or other types of resources purchased from a utility or other source 410. The second term in the cost function $J(x)$ represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs. In some embodiments, asset allocator 402 may be configured to minimize the total amount of each resource obtained from sources 410 over the duration of the optimization horizon, regardless of cost or price, to minimize the resource consumption of asset allocation system 400.

Each of subplants 420 and storage 430 may include building equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the objective function subject to the following constraint, which guarantees the balance between resources purchased, produced, discharged, consumed, and requested over the optimization horizon:

$$\sum_{sources} \mathrm{purchase}_{resource,time} +$$
$$\sum_{subplants} \mathrm{produces}(x_{internal,time}, \, x_{external,time}, \, v_{uncontrolled,time}) -$$
$$\sum_{subplants} \mathrm{consumes}(x_{internal,time}, \, x_{external,time}, \, v_{uncontrolled,time}) +$$
$$\sum_{storages} \mathrm{discharges}_{resource}(x_{internal,time}, \, x_{external,time}) - \sum_{sinks} \mathrm{requests}_{resource} =$$
$$0 \; \forall \; \mathrm{resources}, \, \forall \; \mathrm{time} \in \mathrm{horizon}$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during run-time; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Central Plant Controller

Referring now to FIG. 5, a block diagram of a central plant controller 500 in which asset allocator 402 can be implemented is shown, according to an exemplary embodiment. In various embodiments, central plant controller 500 can be configured to monitor and control central plant 200, asset allocation system 400, and various components thereof (e.g., sources 410, subplants 420, storage 430, sinks 440, etc.). Central plant controller 500 is shown providing control decisions to a building management system (BMS) 506. The control decisions provided to BMS 506 may include resource purchase amounts for sources 410, setpoints for subplants 420, and/or charge/discharge rates for storage 430. In other embodiments, the central plant controller is configured in a planning tool implementation in which an operation of the central plant is planned over an optimization horizon (e.g., 1 year) for use in planning, operational decision-making, budgeting, planning for purchase of new assets, etc.

In some embodiments, BMS 506 is the same or similar to the BMS described with reference to FIG. 1. BMS 506 may be configured to monitor conditions within a controlled building or building zone. For example, BMS 506 may receive input from various sensors (e.g., temperature sensors, humidity sensors, airflow sensors, voltage sensors, etc.) distributed throughout the building and may report building conditions to central plant controller 500. Building conditions may include, for example, a temperature of the building or a zone of the building, a power consumption (e.g., electric load) of the building, a state of one or more actuators configured to affect a controlled state within the building, or other types of information relating to the controlled building. BMS 506 may operate subplants 420 and storage 430 to affect the monitored conditions within the building and to serve the thermal energy loads of the building.

BMS 506 may receive control signals from central plant controller 500 specifying on/off states, charge/discharge rates, and/or setpoints for the subplant equipment. BMS 506 may control the equipment (e.g., via actuators, power relays, etc.) in accordance with the control signals provided by central plant controller 500. For example, BMS 506 may operate the equipment using closed loop control to achieve the setpoints specified by central plant controller 500. In various embodiments, BMS 506 may be combined with central plant controller 500 or may be part of a separate building management system. According to an exemplary embodiment, BMS 506 is a METASYS® brand building management system, as sold by Johnson Controls, Inc.

Central plant controller 500 may monitor the status of the controlled building using information received from BMS 506. Central plant controller 500 may be configured to predict the thermal energy loads (e.g., heating loads, cooling loads, etc.) of the building for plurality of time steps in an optimization horizon (e.g., using weather forecasts from a weather service 504). Central plant controller 500 may also predict the revenue generation potential of incentive based demand response (IBDR) programs using an incentive event history (e.g., past clearing prices, mileage ratios, event probabilities, etc.) from incentive programs 502. Central plant controller 500 may generate control decisions that optimize the economic value of operating central plant 200 over the duration of the optimization horizon subject to constraints on the optimization process (e.g., energy balance constraints, load satisfaction constraints, etc.). The optimization process performed by central plant controller 500 is described in greater detail below.

In some embodiments, central plant controller 500 is integrated within a single computer (e.g., one server, one housing, etc.). In various other exemplary embodiments, central plant controller 500 can be distributed across multiple servers or computers (e.g., that can exist in distributed locations). In another exemplary embodiment, central plant controller 500 may integrated with a smart building manager that manages multiple building systems and/or combined with BMS 506.

Central plant controller 500 is shown to include a communications interface 536 and a processing circuit 507. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between central plant controller 500 and various external systems or devices (e.g., BMS 506, subplants 420, storage 430, sources 410, etc.). For example, central plant controller 500 may receive information from BMS 506 indicating one or more measured states of the controlled building (e.g., temperature, humidity, electric loads, etc.) and one or more states of subplants 420 and/or storage 430 (e.g., equipment status, power consumption, equipment availability, etc.). Communications interface 536 may receive inputs from BMS 506, subplants 420, and/or storage 430 and may provide operating parameters (e.g., on/off decisions, setpoints, etc.) to subplants 420 and storage 430 via BMS 506. The operating parameters may cause subplants 420 and storage 430 to activate, deactivate, or adjust a setpoint for various devices thereof.

Still referring to FIG. 5, processing circuit 507 is shown to include a processor 508 and memory 510. Processor 508 may be a general purpose or specific purpose processor, an application specific integrated circuit (ASIC), one or more field programmable gate arrays (FPGAs), a group of processing components, or other suitable processing components. Processor 508 may be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 may be communicably connected to processor 508 via processing circuit 507 and may include computer code for executing (e.g., by processor 508) one or more processes described herein.

Memory 510 is shown to include a building status monitor 524. Central plant controller 500 may receive data regarding the overall building or building space to be heated or cooled by system 400 via building status monitor 524. In an exemplary embodiment, building status monitor 524 may include a graphical user interface component configured to provide graphical user interfaces to a user for selecting building requirements (e.g., overall temperature parameters, selecting schedules for the building, selecting different temperature levels for different building zones, etc.).

Central plant controller 500 may determine on/off configurations and operating setpoints to satisfy the building requirements received from building status monitor 524. In some embodiments, building status monitor 524 receives, collects, stores, and/or transmits cooling load requirements, building temperature setpoints, occupancy data, weather data, energy data, schedule data, and other building parameters. In some embodiments, building status monitor 524 stores data regarding energy costs, such as pricing information available from sources 410 (energy charge, demand charge, etc.).

Still referring to FIG. 5, memory 510 is shown to include a load/rate predictor 522. Load/rate predictor 522 may be configured to predict the thermal energy loads ($\hat{\ell}_k$) of the building or campus for each time step k (e.g., k=1 ... n) of an optimization horizon. Load/rate predictor 522 is shown receiving weather forecasts from a weather service 504. In some embodiments, load/rate predictor 522 predicts the thermal energy loads $\hat{\ell}_{k|k}$ as a function of the weather forecasts. In some embodiments, load/rate predictor 522 uses feedback from BMS 506 to predict loads $\hat{\ell}_{k|k}$. Feedback from BMS 506 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BMS 506 (e.g., via building status monitor 524). Load/rate predictor 522 may predict loads $\hat{\ell}_{k\,k}$ as a function of a given weather forecast ($\hat{\phi}_w$), a day type (day), the time of day (t), and previous measured load data ($Y_{k-1}$). Such a relationship is expressed in the following equation:

$$\hat{\ell}_{k\,k}=f(\hat{\phi}_w,\text{day},t|Y_{k-1})$$

In some embodiments, load/rate predictor 522 uses a deterministic plus stochastic model trained from historical load data to predict loads $\hat{\ell}_{k\,k}$. Load/rate predictor 522 may use any of a variety of prediction methods to predict loads $\hat{\ell}_{k\,k}$ (e.g., linear regression for the deterministic portion and an AR model for the stochastic portion). Load/rate predictor 522 may predict one or more different types of loads for the building or campus. For example, load/rate predictor 522 may predict a hot water load $\hat{\ell}_{Hot,k}$ and a cold water load $\hat{\ell}_{Cold,k}$ for each time step k within the prediction window. In some embodiments, load/rate predictor 522 makes load/rate predictions using the techniques described in U.S. patent application Ser. No. 14/717,593.

Load/rate predictor 522 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 522.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 530 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 522 may store the predicted loads $\hat{\ell}_{k\,k}$ and the utility rates in memory 510 and/or provide the predicted loads $\hat{\ell}_{k\,k}$, and the utility rates to demand response optimizer 530.

Still referring to FIG. 5, memory 510 is shown to include an incentive estimator 520. Incentive estimator 520 may be configured to estimate the revenue generation potential of participating in various incentive-based demand response (IBDR) programs. In some embodiments, incentive estimator 520 receives an incentive event history from incentive programs 502. The incentive event history may include a history of past IBDR events from incentive programs 502.

An IBDR event may include an invitation from incentive programs 502 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 520 may use the incentive event history to estimate IBDR event probabilities during the optimization horizon.

Incentive estimator 520 is shown providing incentive predictions to demand response optimizer 530. The incentive predictions may include the estimated IBDR probabilities, estimated participation requirements, an estimated amount of revenue from participating in the estimated IBDR events, and/or any other attributes of the predicted IBDR events. Demand response optimizer 530 may use the incentive predictions along with the predicted loads $\hat{\ell}_{k\,k}$ and utility rates from load/rate predictor 522 to determine an optimal set of control decisions for each time step within the optimization horizon.

Still referring to FIG. 5, memory 510 is shown to include a demand response optimizer 530. Demand response optimizer 530 may perform a cascaded optimization process to optimize the performance of asset allocation system 400. For example, demand response optimizer 530 is shown to include asset allocator 402 and a low level optimizer 534. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, resource purchase amounts for each type of resource purchased from sources 410, and/or an amount of each resource sold to energy purchasers 504. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 534 may control an inner (e.g., equipment level) loop of the cascaded optimization. Low level optimizer 534 may determine how to best run each subplant at the load setpoint determined by asset allocator 402. For example, low level optimizer 534 may determine on/off states and/or operating setpoints for various devices of the subplant equipment in order to optimize (e.g., minimize) the energy consumption of each subplant while meeting the resource allocation setpoint for the subplant. In some embodiments, low level optimizer 534 receives actual incentive events from incentive programs 502. Low level optimizer 534 may determine whether to participate in the incentive events based on the resource allocation set by asset allocator 402. For example, if insufficient resources have been allocated to a particular IBDR program by asset allocator 402 or if the allocated resources have already been used, low level optimizer 534 may determine that asset allocation system 400 will not participate in the IBDR program and may ignore the IBDR event. However, if the required resources have been allocated to the IBDR program and are available in storage 430, low level optimizer 534 may determine that system 400 will participate in the IBDR program in response to the IBDR event. The cascaded optimization process performed by demand response optimizer 530 is described in greater detail in U.S. patent application Ser. No. 15/247,885.

In some embodiments, low level optimizer 534 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 534 generates the subplant curves by running the low level optimization process for various combinations of subplant loads and weather conditions to generate multiple data points. Low level optimizer 534 may fit a curve to the data points to generate the subplant curves. In other embodiments, low level optimizer 534 provides the data points asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 518. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Still referring to FIG. 5, memory 510 is shown to include a subplant control module 528. Subplant control module 528 may store historical data regarding past operating statuses, past operating setpoints, and instructions for calculating and/or implementing control parameters for subplants 420 and storage 430. Subplant control module 528 may also receive, store, and/or transmit data regarding the conditions of individual devices of the subplant equipment, such as operating efficiency, equipment degradation, a date since last service, a lifespan parameter, a condition grade, or other device-specific data. Subplant control module 528 may receive data from subplants 420, storage 430, and/or BMS 506 via communications interface 536. Subplant control module 528 may also receive and store on/off statuses and operating setpoints from low level optimizer 534.

Data and processing results from demand response optimizer 530, subplant control module 528, or other modules of central plant controller 500 may be accessed by (or pushed to) monitoring and reporting applications 526. Monitoring and reporting applications 526 may be configured to generate real time "system health" dashboards that can be viewed and navigated by a user (e.g., a system engineer). For example, monitoring and reporting applications 526 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 5, central plant controller 500 may include one or more GUI servers, web services 512, or GUI engines 514 to support monitoring and reporting applications 526. In various embodiments, applications 526, web services 512, and GUI engine 514 may be provided as separate components outside of central plant controller 500 (e.g., as part of a smart building manager). Central plant controller 500 may be configured to maintain detailed historical databases (e.g., relational databases, XML, databases, etc.) of relevant data and includes computer code modules that continuously, frequently, or infrequently query, aggregate, transform, search, or otherwise process the data maintained in the detailed databases. Central plant controller 500 may be configured to provide the results of any such processing to other databases, tables, XML files, or other data structures for further querying, calculation, or access by, for example, external monitoring and reporting applications.

Central plant controller 500 is shown to include configuration tools 516. Configuration tools 516 can allow a user to define (e.g., via graphical user interfaces, via prompt-driven "wizards," etc.) how central plant controller 500 should react to changing conditions in the energy storage subsystems. In an exemplary embodiment, configuration tools 516 allow a user to build and store condition-response scenarios that can cross multiple energy storage system devices, multiple building systems, and multiple enterprise control applications (e.g., work order management system applications, entity resource planning applications, etc.). For example, configuration tools 516 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 516 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Asset Allocator

Figure 6:
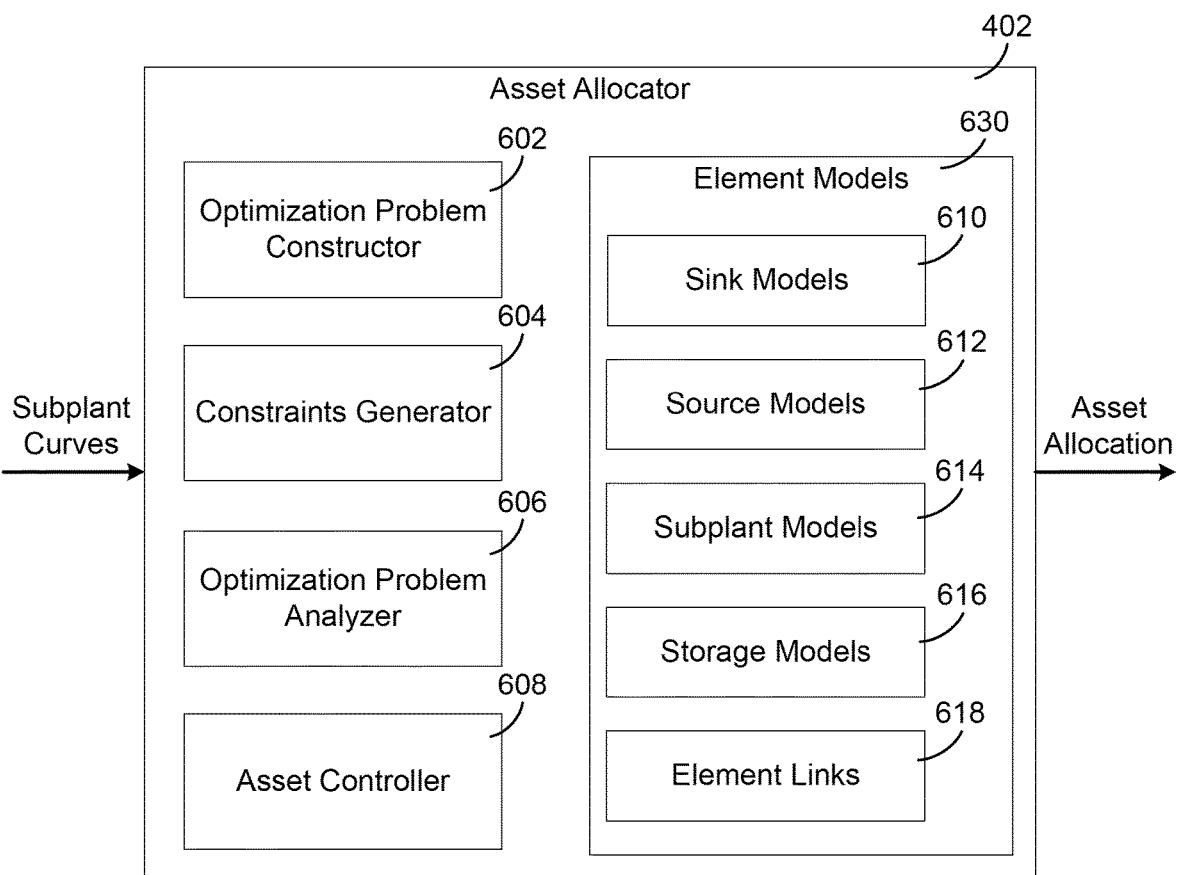
FIG. 6 is a block diagram of the asset allocator of FIG. 4 in greater detail, according to some embodiments.

Referring now to FIG. 6, a block diagram illustrating asset allocator 402 in greater detail is shown, according to an exemplary embodiment. Asset allocator 402 may be configured to control the distribution, production, storage, and usage of resources in a central plant. Asset allocator 402 can be configured to generate a high-level optimization problem, generate constraints for the optimization problem, and solve the optimization problem subject to the constraints. Based on the results of the optimization process, asset allocator 402 may dispatch all campus energy assets in order to meet the requested heating, cooling, and electrical loads of the campus for each time step within an optimization horizon or optimization horizon.

In some embodiments, asset allocator 402 can be configured to minimize the economic cost of operating a central plant over the duration of the optimization horizon, as described above. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs. In some embodiments, asset allocator 402 may be configured to minimize the total amount of each resource obtained from sources 410 over the duration of the optimization horizon, regardless of cost or price, to minimize the resource consumption of asset allocation system 400.

In some embodiments, asset allocator 402 performs an optimization process to determine an optimal set of control decisions for each time step within an optimization horizon. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, asset allocator 402 is configured to optimally dispatch all campus energy assets in order to meet the requested heating, cooling, and electrical loads of the campus for each time step within the optimization horizon.

Throughout this disclosure, asset allocator 402 is described as actively identifying or defining various items (e.g., sources 410, subplants 420, storage 430, sinks 440, operational domains, etc.). However, it should be understood that asset allocator 402 can also, or alternatively, receive such items as inputs. For example, the existence of such items can be defined by a user (e.g., via a user interface) or any other data source (e.g., another algorithm, an external system or process, etc.). Asset allocator 402 can be configured to identify which of these items have been defined or identified and can generate an appropriate objective function and optimization constraints, based on the existence of these items. It should be understood that the acts of identifying or defining these items can include asset allocator 402 identifying, detecting, receiving, or otherwise obtaining a pre-defined item an input.

Still referring to FIG. 6, asset allocator 402 is shown to include an optimization problem constructor 602. Optimization problem constructor 602 can be configured to construct the high level (i.e., asset allocation) optimization problem solved by asset allocator 402. In some embodiments, the high level optimization problem includes one or more of the elements of asset allocation system 400. For example, the optimization problem can include sources 410, subplants 420, storage 430, and sinks 440, as described with reference to FIG. 4. The optimization problem generated by optimization problem constructor 602 can be considered a finite-horizon optimal control problem. The optimization problem may take the form $\arg_x \min F(x)$, where F(x) is an objective function.

In some embodiments, F(x) may be defined as the cost function J(x) as defined above. In some embodiments, F(x) may be an objective function that quantifies energy/resource consumption rather than financial cost, such as by summing a total amount of each resource obtained from source 410. Optimization problem constructor 602 can be configured to generate the objective function and apply the objective function to the optimization problem. Optimization problem constructor 602 may take into account all variables which may impact the objective function, such as the load capacity of subplants 420 or the storage capacity of storage 430, for example.

Still referring to FIG. 6, asset allocator 402 is shown to include constraints generator 604. Constraints generator 604 may generate constraints for the high level optimization problem, including resource balance constraints (e.g., hot water balance, chilled water balance, electricity balance, etc.), operational domain constraints for each of subplants 420, state of charge (SOC) and storage capacity constraints for each of storage 430, decision variable constraints (e.g., subplant capacity constraints, charge and discharge of storage constraints, and storage capacity constraints), demand/peak usage constraints, auxiliary constraints, and any site specific or commissioned constraints. Operational domain constraints may be generalized versions of the subplant curves, as described in U.S. patent application Ser. No. 15/473,496 filed Mar. 29, 2017, which is incorporated by reference herein in its entirety.

In some embodiments, constraints generator 604 may generate a set of override constraints based on a user input specifying an amount of a resource to be produced by a selected subplant. Override constraints may be generated based on a user input. For example, a user may select electricity subplant 425 and specify an amount of electricity to be produced by the subplant by entering a load (e.g., a percentage of maximum subplant load) for electricity subplant 425 to produce. Generally, override constraints may include hard constraints and/or soft constraints, described below.

In some embodiments, hard constraints may be may be defined as $S_{subplant}produces = O_{subplant}$, where $S_{subplant}$produces is the amount of a resource produced by a subplant and $O_{subplant}$ is the override amount. In other embodiments, hard constraints may be may be defined as $S_{subplant}$produces$-O_{subplant} \leq e_{subplant}$ and $O_{subplant}-S_{subplant}$produces$\leq e_{subplant}$, where $e_{subplant}$ is an allowed error between the amount of the resource produced by a subplant and the override value commanded by the user. Another way to write this constraint is $-e_{subplant} \leq S_{subplant}$produces$-O_{subplant} \leq e_{subplant}$ In the case of hard constraints, the allowed error $e_{subplant}$ may be set to a fixed value (e.g., $e_{subplant}=25$) such that the difference between the subplant production $S_{subplant}$produces and the override amount $O_{subplant}$ is kept within a range between $-e_{subplant}$ and $e_{subplant}$, regardless of whether $S_{subplant}$produces is greater than $O_{subplant}$ or vice versa. The fixed value of the allowed error $e_{subplant}$ may depend on the particular type of resource or subplant to which the constraint applies and, in some embodiments, can be specified by a user along with the override amount $O_{subplant}$ In either case, each variable of the constraints may be treated as a vector, such that each variable can contain multiple values. For example, $O_{subplant}$ may be defined as $[O_{subplant_1}, O_{subplant_2}, \ldots, O_{subplant_h}]$, where h is the total number of time steps of an optimization horizon. In some cases, the user may wish to override the subplant loads for only a subset of the time steps in the optimization horizon, in which case the variable $O_{subplant}$ would be a vector that specifies subplant load values for only a subset of time steps. Any values that are not specified by the user may be treated as free variables to be in the optimization process.

In some embodiments, soft constraints may be may be defined as a penalty term added to the objective function along with corresponding optimization constraints that apply to the penalty term. Soft constraints allow the amount of a resource produced by a subplant, $S_{subplant}$produces, to take a larger range of values, but penalize a difference between the $S_{subplant}$produces value and the override value $O_{subplant}$ For example, a soft constraint may be added to the cost function $J(x)$ such that:

$$J(x) = \sum_{sources} \sum_{horizon} cost(purchase_{resource,time}, time) - \\ \sum_{incentives} \sum_{horizon} revenue(ReservationAmount) + p * d_{subplant}$$

where $d_{subplant}$ is a slack variable representing a difference between $S_{subplant}$produces and $O_{subplant}$, and p is a penalty weight that is multiplied by $d_{subplant}$. The slack variable $d_{subplant}$ can be constrained by adding the optimization constraints $S_{subplant}$produces$-O_{subplant}\leq d_{subplant}$ and $O_{subplant}-S_{subplant}$produces$\leq d_{subplant}$ to the optimization problem such that $d_{subplant}$ will be greater than or equal to the difference between $S_{subplant}$produces and $O_{subplant}$, regardless of whether $S_{subplant}$produces is greater than $O_{subplant}$ or vice versa. These two constraints are functionally equivalent to a single constraint $|S_{subplant}$produces$-O_{subplant}|\leq d_{subplant}$ that requires $d_{subplant}$ to be greater than or equal to the absolute value of the difference $S_{subplant}$produces$-O_{subplant}$ However, replacing this absolute value constraint with the pair of constraints $S_{subplant}$produces$-O_{subplant}\leq d_{subplant}$ and $O_{subplant}-S_{subplant}$produces$\leq d_{subplant}$ advantageously allows for all of the constraints to be linear, which reduces computation time.

Still referring to FIG. 6, asset allocator 402 is shown to include optimization problem analyzer 606. Optimization problem analyzer 606 may be configured to solve the high level optimization problem generated by optimization problem constructor 602. In other words, optimization problem analyzer 606 may be configured to perform an optimization on an objective function. For example, optimization problem analyzer 606 may minimize the value $F(x)$, as required by the optimization problem $arg_x min\ F(x)$. Optimization problem analyzer 606 may also be configured to perform the optimization on the objective function subject to one or more of the constraints described above. In normal operation, optimization problem analyzer 606 does not subject the optimization of the object function to an override constraint. Override constraints are only applied by optimization problem analyzer 606 in response to a user input of an override value.

Optimization problem analyzer 606 may determine an amount of each resource to be purchased, produced, discharged, consumed, or requested by each element of the central plant (e.g., each subplant), based on the results of the optimization problem. More generally, optimization problem analyzer 606 determines a set of control decisions for each element of the central plant. Control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, optimization problem analyzer 606 determines a vector of load values for each subplant, where each value of the vector of load values corresponds to a time step. For example, optimization problem analyzer 606 may determine load setpoints for each of subplants 420, charge/discharge rates for each of storage 430, resource purchase amounts for each type of resource purchased from sources 410, and/or an amount of each resource sold to energy purchasers 504.

Still referring to FIG. 6, asset allocator 402 is shown to include asset controller 608. Asset controller 608 may be configured to control elements of asset allocation system 400 based on the set of control decisions determined by optimization problem analyzer 606. Asset controller 608 may command load setpoints for each of subplants 420, charge/discharge rates for each of storage 430, and/or resource purchase amounts for each type of resource purchased from sources 410. Asset controller 608 may generally operate at a subplant level, sending control signals to sources 410, subplants 420, storage 430, and/or sinks 440, while not directly controlling building equipment (e.g., individual subplants).

Still referring to FIG. 6, asset allocator 402 is shown to include element models 630. Element models 630 may store definitions and/or models for various elements of the high level optimization problem. For example, element models 630 are shown to include source models 610, source models 612, subplant models 614, storage models 616, and element links 618. In some embodiments, element models 630 include data objects that define various attributes or properties of sinks 440, sources 410, subplants 420, and storage 430 (e.g., using object-oriented programming).

For example, source models 612 may define the type of resource provided by each of sources 410, a cost of each resource, demand charges associated with the consumption of the resource, a maximum rate at which the resource can be purchased from each of sources 410, and other attributes of sources 410. Similarly, subplant models 614 may define the input resources of each subplant 420, the output resources of each subplant 420, relationships between the input and output variables of each subplant 420 (i.e., the operational domain of each subplant 420), and optimization constraints associated with each of subplants 420. Each of element models 630 are described in greater detail below.

Element models 630 are shown to include source models 610. Source models 610 may store models for each of sinks 440. As described above, sinks 440 may include resource consumers or requested loads. Some examples are the campus thermal loads and campus electricity usage. The predicted consumption of a sink 440 over the optimization horizon can be supplied as an input to asset allocator 402 and/or computed by load/rate predictor 522. Source models 610 may store the predicted consumption over the optimization horizon for each of sinks 440. Source models 610 may also store any unmet/overmet load for each of sinks 440, carryover from the previous time steps, and any incentives earned by supplying each of sinks 440 (e.g., for sinks such as an energy purchasers or an energy grid).

Carryover can be defined as the amount of unmet or overmet load for a particular resource from the previous time step. In some embodiments, asset allocator 402 determines the carryover by adding the entire unmet load for a particular resource in one time step to the requested load for the resource at the next time step. However, calculating the carryover in this manner may not always be appropriate since the carryover may grow over time. As an example, consider an unmet chilled water load. If there are several time steps where the chilled water load is not met, the buildings supplied by the load will heat up. Due to this increase in building temperature, the amount of chilled water load required to decrease the building temperature to the set-point is not a linearly increasing function of the sum of the unmet load over the past time steps because the building temperature will begin approaching the ambient temperature.

Still referring to FIG. 6, element models 630 are shown to include source models 612. Source models 612 may store models for each of sources 410. As described above, sources 410 may include utilities or markets where resources may be purchased. Source models 612 may store a price per unit of a resource purchased from each of sources 410 (e.g., $/kWh of electricity, $/liter of water, etc.). This cost can be included as a direct cost associated with resource usage in the cost function. In some embodiments, source models 612 store costs associated with demand charges and demand constraints, incentive programs (e.g., frequency response and economic demand response) and/or sell back programs for one or more of sources 410.

Referring again to FIG. 6, element models 630 are shown to include subplant models 614. Subplant models 614 may store models for each of subplants 420. As discussed above, subplants 420 are the main assets of a central plant. Subplants 420 can be configured to convert resource types, making it possible to balance requested loads from the building or campus using resources purchased from sources 410. This general definition allows for a diverse set of central plant configurations and equipment types as well as varying degrees of subplant modeling fidelity and resolution.

In some embodiments, subplant models 614 identify each of subplants 420 as well as the optimization variables associated with each subplant. The optimization variables of a subplant can include the resources consumed, the resources produced, intrinsic variables, and extrinsic variables. Intrinsic variables may be internal to the optimization formulation and can include any auxiliary variables used to formulate the optimization problem. Extrinsic variables may be variables that are shared among subplants (e.g., condenser water temperature).

In some embodiments, subplant models 614 describe the relationships between the optimization variables of each subplant. For example, subplant models 614 can include subplant curves that define the output resource production of a subplant as a function of one or more input resources provided to the subplant.

In some embodiments, subplant models 614 store the input data used to generate the subplant constraints. Such input data may include sampled data points of the high level subplant curve/operational domain. For example, for chiller subplant 422, this data may include several points sampled from the subplant curve 1300 (shown in FIG. 13). When implemented as part of an online operational tool (shown in FIG. 7), the high level subplant operational domain can be sampled by querying low level optimizer 634 at several requested production amounts. When implemented as part of an offline planning tool (shown in FIG. 8), the sampled data may be user-specified efficiency and capacity data.

Still referring to FIG. 6, element models 630 are shown to include storage models 616. Storage models 616 may store models for each of storage 430. Storage models 616 can define the types of resources stored by each of storage 430, as well as storage constraints that limit the state-of-charge (e.g., maximum charge level) and/or the rates at which each storage 430 can be charged or discharged.

Still referring to FIG. 6, element models 630 are shown to include element links 618. In some embodiments, element links 618 define the connections between sources 410, subplants 420, storage 430, and sinks 440. These links 940 are shown as lines connecting various elements in plant resource diagram 500. For example, element links 618 may define which of sources 410 provide resources to each of subplants 420, which subplants 420 are connected to which storage 430, and which subplants 420 and/or storage 430 provide resources to each of sinks 440. Element links 618 may contain the data and methods needed to create and solve an instance of the high level optimization problem.

In some embodiments, element links 618 link sources 410, subplants 420, storage 430, and sinks 440 (i.e., the high level problem elements) using a netlist of connections between high level problem elements. The information provided by element links 618 may allow multiple subplants 420, storage 430, sinks 440, and sources of the same type to be defined. Rather than assuming that all elements contribute to and draw from a common pool of each resource, element links 618 can be used to specify the particular connections between elements. Accordingly, multiple resources of the same type can be defined such that a first subset of subplants 420 produce a first resource of a given type (e.g., Chilled Water A), whereas a second subset of subplants 420 produce a second resource of the same type (e.g., Chilled Water B). Advantageously, element links 618 can be used to build constraints that reflect the actual physical connections between equipment in a central plant.

Asset Allocation Override

Referring now to FIG. 7, a flow diagram illustrates optimization process 700 which optimizes an objective function subject to a user input of an override value of one or more resources produced by one or more subplants (e.g., subplants 420 of asset allocation system 400), according to some embodiments. Optimization process 700 may be performed by asset allocator 402 as previously disclosed. In some embodiments, a user may override the recommended heating, cooling, electricity, or energy load of a subplant (e.g., one of subplants 420) by entering an override load value (i.e., input override) that more closely suits the user's desired subplant load. For example, a user may decide that a first electricity subplant (e.g., electricity subplant 425) should produce more electricity than recommended by asset allocator 402, in which case the user may enter a new load setpoint, defining how much electricity that electricity subplant 425 should produce. Recommended subplant loads may be generated by asset allocator 402 by performing an optimization of an objective function without override constraints, as defined above. Asset allocator 402 generally performs an optimization on the objective function subject to a number of constraints, as defined below.

At step 702, an objective function is obtained. In some embodiments, the objective function may be a cost function $J(x)$, defined as:

$$J(x) = \sum_{sources} \sum_{horizon} \text{cost}\left(\text{purchase}_{resource,time}, \text{time}\right) -$$

$$\sum_{incentives} \sum_{horizon} \text{revenue}(ReservationAmount)$$

where first term of $J(x)$ represents the total cost of all resources purchased by a central plant over an optimization horizon. Resources can include, for example, water, electricity, natural gas, or other types of resources purchased from a utility or other source (e.g., one of sources 410). The second term of $J(x)$ represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs. In some embodiments, the objective function quantifies energy/resource consumption rather than financial cost by summing a total amount of each resource obtained from sources 410 over the duration of the optimization horizon, regardless of cost or price.

At step 704, a user input is received that selects a subplant and specifies an amount of a resource to be produced by the selected subplant. A user may select a subplant and choose to modify the recommended subplant load (i.e., input a load override) at one or more time steps over a time horizon. The user input of a subplant load override may be received from a number of sources such as a client device 368 or configuration tools 516, for example. In some embodiments, the user may select multiple subplants and input a unique load override for each subplant. For example, one of sinks 440 (e.g., cold water load 444) may request an amount, $X_0$, of a first resource (e.g., cold water). The asset allocator 402 may dispatch a first chiller subplant, $S_1$ (e.g., chiller subplant 422) to produce the requested amount, $X_0$, of cold water, while a second chiller subplant, $S_2$ may not be dispatched to produce chilled water. A user may choose to override one or more of the recommended subplants loads, for example by specifying that the second chiller subplant $S_2$ may produce an amount $X_2$ of water. An amount of cold water $X_1$ provided by the first chiller subplant $S_1$ may then be updated per the following steps of process 700, such that $X_1+X_2=X_0$.

At step 706, an override constraint is generated based on the user input of a load override. In some embodiments, multiple override constraints are generated, such as when the user selects multiple subplants and inputs a unique load override for each subplant. Override constraints may be defined as hard constraints or soft constraints, depending on the application and on user preferences. Override constraints are generated based on the load override entered at step 704.

In some embodiments, hard constraints may be may be defined as $S_{subplant}produces=O_{subplant}$, where $S_{subplant}produces$ is the amount of a resource produced by a subplant and $O_{subplant}$ is the override amount. In other embodiments, hard constraints may be may be defined as $S_{subplant}produces-O_{subplant}\leq e_{subplant}$ and $O_{subplant}-S_{subplant}produces\leq e_{subplant}$, where $e_{subplant}$ is an allowed error between the amount of the resource produced by a subplant and the override value commanded by the user. Another way to write this constraint is $-e_{subplant}\leq S_{subplant}produces-O_{subplant}\leq e_{subplant}$. In the case of hard constraints, the allowed error $e_{subplant}$ may be set to a fixed value (e.g., $e_{subplant}=25$) such that the difference between the subplant production $S_{subplant}produces$ and the override amount $O_{subplant}$ is kept within a range between $-e_{subplant}$ and $e_{subplant}$, regardless of whether $S_{subplant}produces$ is greater than $O_{subplant}$ or vice versa. The fixed value of the allowed error $e_{subplant}$ may depend on the particular type of resource or subplant to which the constraint applies and, in some embodiments, can be specified by a user along with the override amount $O_{subplant}$. In either case, each variable of the constraints may be treated as a vector, such that each variable can contain multiple values. For example, $O_{subplant}$ may be defined as $[O_{subplant_1}, O_{subplant_2}, \ldots, O_{subplant_h}]$, where h is the total number of time steps of an optimization horizon. In some cases, the user may wish to override the subplant loads for only a subset of the time steps in the optimization horizon, in which case the variable $O_{subplant}$ would be a vector that specifies subplant load values for only a subset of time steps. Any values that are not specified by the user may be treated as free variables to be in the optimization process.

In some embodiments, soft constraints may be may be defined as a penalty term added to the objective function along with corresponding optimization constraints that apply to the penalty term. Soft constraints allow the amount of a resource produced by a subplant, $S_{subplant}produces$, to take a larger range of values, but penalize a difference between the $S_{subplant}produces$ value and the override value $O_{subplant}$. For example, a soft constraint may be added to the cost function J(x) such that:

$$J(x) = \sum_{sources} \sum_{horizon} cost(purchase_{resource,time}, time) - $$
$$\sum_{incentives} \sum_{horizon} revenue(ReservationAmount) + p*d_{subplant}$$

where $d_{subplant}$ is a slack variable representing a difference between $S_{subplant}produces$ and subplant, and p is a penalty weight that is multiplied by $d_{subplant}$. The slack variable $d_{subplant}$ can be constrained by adding the optimization constraints $S_{subplant}produces-O_{subplant}\leq d_{subplant}$ and $O_{subplant}-S_{subplant}produces\leq d_{subplant}$ to the optimization problem such that $d_{subplant}$ will be greater than or equal to the difference between $S_{subplant}produces$ and subplant, regardless of whether $S_{subplant}produces$ is greater than $O_{subplant}$ or vice versa. These two constraints are functionally equivalent to a single constraint $|S_{subplant}produces-O_{subplant}|\leq d_{subplant}$ that requires $d_{subplant}$ to be greater than or equal to the absolute value of the difference $S_{subplant}produces-O_{subplant}$. However, replacing this absolute value constraint with the pair of constraints $S_{subplant}produces-O_{subplant}\leq d_{subplant}$ and $O_{subplant}-S_{subplant}produces\leq d_{subplant}$ advantageously allows for all of the constraints to be linear, which reduces computation time.

At step 708, an optimization is performed on the objective function, subject to the override constraints above, to determine the amounts of resources purchased, produced, discharged, consumed, and requested by a plurality of subplants over an optimization horizon. The optimization is also performed subject to the balance constraints, operational domain constraints, etc., as defined above. In some embodiments, the optimization is performed on the objective function such that the total amount of each resource obtained from sources 410 over the duration of the optimization horizon is minimized, regardless of cost or price, to minimize the total resource consumption of the central plant.

In some embodiments, the optimization is performed on the cost function, J(x), as defined above. The optimization of J(x) may be expressed as:

$$\underset{x}{argmin}J(x)$$

where J(x) is minimized over the optimization horizon such that the economic costs of operating an energy management system (e.g., asset allocation system 400), as defined by J(x), may be minimized (or the economic value may be maximized). The economic cost may account for the cost of resources purchased (e.g., from sources 410) as well as the revenue generated by selling resources (e.g., to resource purchasers 441 or energy grid 442) or participating in incentive programs (e.g., IBDR, PBDR programs).

At step 710, the plurality of subplants (e.g., subplants 420) are controlled based on the results of the optimization. In one embodiment, a controller (e.g., central plant controller 500) may provide control decisions to a BMS (e.g., BMS 506) on the amounts of resources purchased, produced, discharged, consumed, and requested by a plurality of subplants (e.g., subplants 420), in accordance with the results of the optimization of the objective function. The control decisions provided to the BMS may include setpoints for the plurality of subplants, resource purchase amounts (e.g., for sources 410), and/or charge/discharge rates (e.g., for storage 430). In turn, the BMS may control the plurality of subplants to meet the control decisions. For example, the BMS 506 may command a subplant (e.g., steam subplant 424) to produce an amount of a resource (e.g., steam) based on the control decision provided by central plant controller 500. Further detail on how central plant controller 500 control decisions may be implemented using BMS 506 to control the plurality of subplants 420 is discussed above, where the control decisions generated by the central plant controller 500 are based on the optimization of the objective function.

Figure 8:
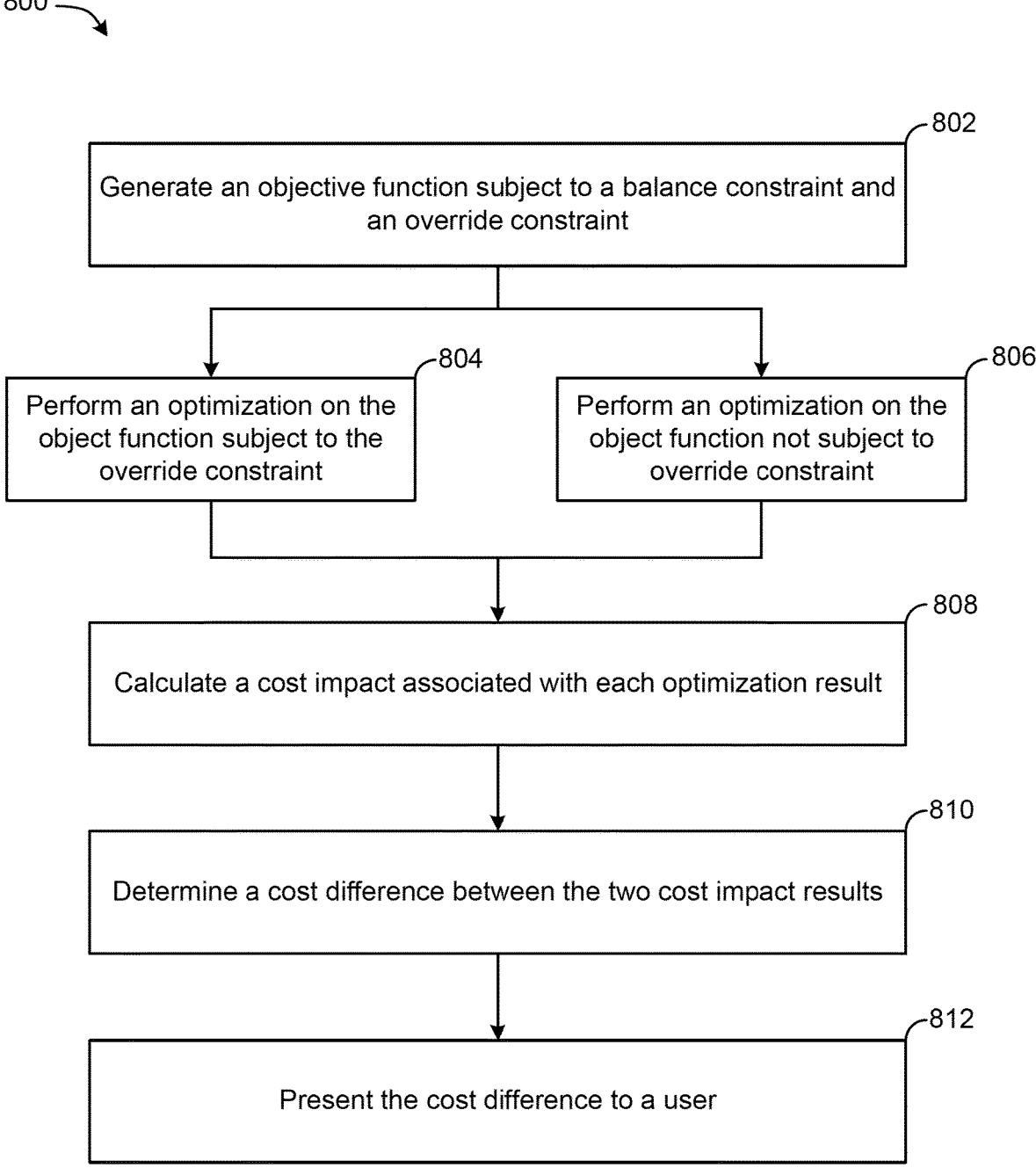
FIG. 8 is a flow diagram illustrating a method of presenting a user with an override impact which defines the difference between two optimized cost functions, according to some embodiments.

Referring now to FIG. 8, a flow diagram illustrates a cost impact decision process 800, which compares the cost impact of multiple cost function optimizations and presents a user with the cost impact of overriding a subplant load as a real value (e.g., dollars, kW, etc.), according to some embodiments. For example, while a user may enter an override value, allowing the user to operate a subplant at a specified load for a specified length of time, the override may cause suboptimal central plant operations. To mitigate suboptimal override decisions and/or to display the effects thereof to a user, the optimization of the objective function may be performed twice, once subject to the override constraint(s) and once without an override constraint(s). The results of the two optimization may then be compared to determine a value (e.g., an increased cost) associated with operating the central plant subject to an override constraint(s) on the production of one or more subplants.

At step 802, an objective function subject a balance constraint and an override constraint is generated. In some embodiments, the objective function generated at step 802 may be subject to additional constraints, defined above. The objective function may be subject to a balance constraint, which guarantees the balance between resources purchased, produced, discharged, consumed, and requested by a plurality of subplants over a time horizon. Additionally, the objective function may be subject to override constraints, also described above, which may be a user input that specifies the amount of a resource to be produced by one or more subplants.

At steps 804 and 806, the generated objective function is optimized over a time horizon. At step 804, the objective function is optimized subject to the override constraint, as described in step 708 of the optimization process 700. At step 806, however, the objective function is optimized without an override constraint. The optimization process of the objective function when not subject to an override constraint is described in detail above. Steps 804 and 806 may be performed simultaneously or in succession by a component of the asset allocation system 400, for example.

At step 808, a cost impact of each optimized cost function is calculated. The cost impact of the optimized cost function may be defined as the cost, for example in currency (e.g., dollars, euros, yuan, rupees, bitcoin), associated with operating a central plant in accordance with the optimization over the optimization horizon. In other words, the cost impact of each optimization result may be the total cost predicted by the objective function when the decision variables are set to values defined by the optimization result. The optimization of the objective function performed in step 804 may result in a first cost impact, whereas the optimization of the objective function performed in step 806 may result in a second cost impact. In some embodiments, the first cost impact resulting from the optimization in step 804 is higher than the second cost impact resulting from the optimization in step 806 due to the additional override constraint in step 804. The calculation of the cost impact for each optimized cost function may be performed by the asset allocator 402, another component of the asset allocation system 420, or the central plant controller 500. In other embodiments, the cost impact of each optimized cost function may be another real value, such as kilowatt hours or BTUs. For example, if the objective function F(x) quantifies energy/resource consumption rather than financial cost, the cost impact calculated in step 808 may be the total amount of energy consumption or resource consumption associated with each optimization result.

At step 810, a cost difference between the two cost impact results is determined. The difference between the cost impacts of the optimized functions may be defined as the override impact. Continuing the example from step 808, the override impact may be calculated by the asset allocator 402, another component of the asset allocation system 420, or the central plant controller 500. The override impact defines the additional cost of operating a central plant in suboptimal conditions (e.g., suboptimal resource production by a plurality of subplants of the central plant in accordance with a user's load override input). In other embodiments, the override impact defines the additional cost of operating the central plant subject to a first optimization, subject to a first override constraint, over a second optimization, subject to a second override constraint. For example, the cost impact as calculated in step 810 may be higher when optimizing the objective function subject to an override constraint as compared to the cost impact not subject to the override constraint, as the override constraint may require a subplant to produce a suboptimal amount of a resource (i.e., the steam subplant 424 producing an excess of steam due to an override constraint).

At step 812, the cost difference (i.e., the override impact) is presented to a user. The user may be presented the override impact via a user interface, where the user interface is implemented via a client device 368, for example. Additionally, the building status monitor 524 or the monitoring and reporting apps 526 may include a user interface that presents the override impact to a user. As described in detail in FIGS. 8 and 9, the user may be presented with an interface that displays the override impact as a dollar amount and displays what override constraints may be contributing to the override impact value. By being presented the override impact, the user may see the economic or resource use impact of overriding a subplant or subplants of the central plant which may prompt the user to adjust or cancel suboptimal override constraints. This may also reassure the user that the cost optimization and asset allocation decisions made by the asset allocator 402 are optimal, for example from an economic viewpoint.

In some embodiments, the user may be presented with a choice to operate the central plant subject to the override constraint or to remove the override constraint and allow the asset allocator 402 to determine optimal subplant operations. The plurality of subplants (e.g., subplants 420) may be controlled based on the user's selection to operate subject to the override constraint or without the override constraint, where the plurality of subplants may be controlled as in step 810 of optimization process 800, described in detail above. In other embodiments, the user may be presented with a choice to operate the central plant in accordance with a first optimization, subject to a first constraint, or in accordance with a second optimization, subject to a second constraint, where the plurality of subplants may be controlled based on the user's selection to operate in accordance with the first or second optimization.

Although process 800 contemplates comparing optimization subject to an override constraint to optimization without an optimization constraint, in other embodiments the process 800 is adapted to provide a comparison of a first optimization subject to a first override constraint with a second optimization subject to a second override constraint. For example, a first optimization of an objective function may be performed subject to a first constraint, which specifies an amount of a first resource to be produced by one or more subplants. A second optimization of the same objective function may be performed subject to a second constraint, that specifies a different amount of the first resource to be produced, and/or that specifies and amount of a second resource to be produced. The results of the two optimizations can then be compared, as described above.

Figure 9:
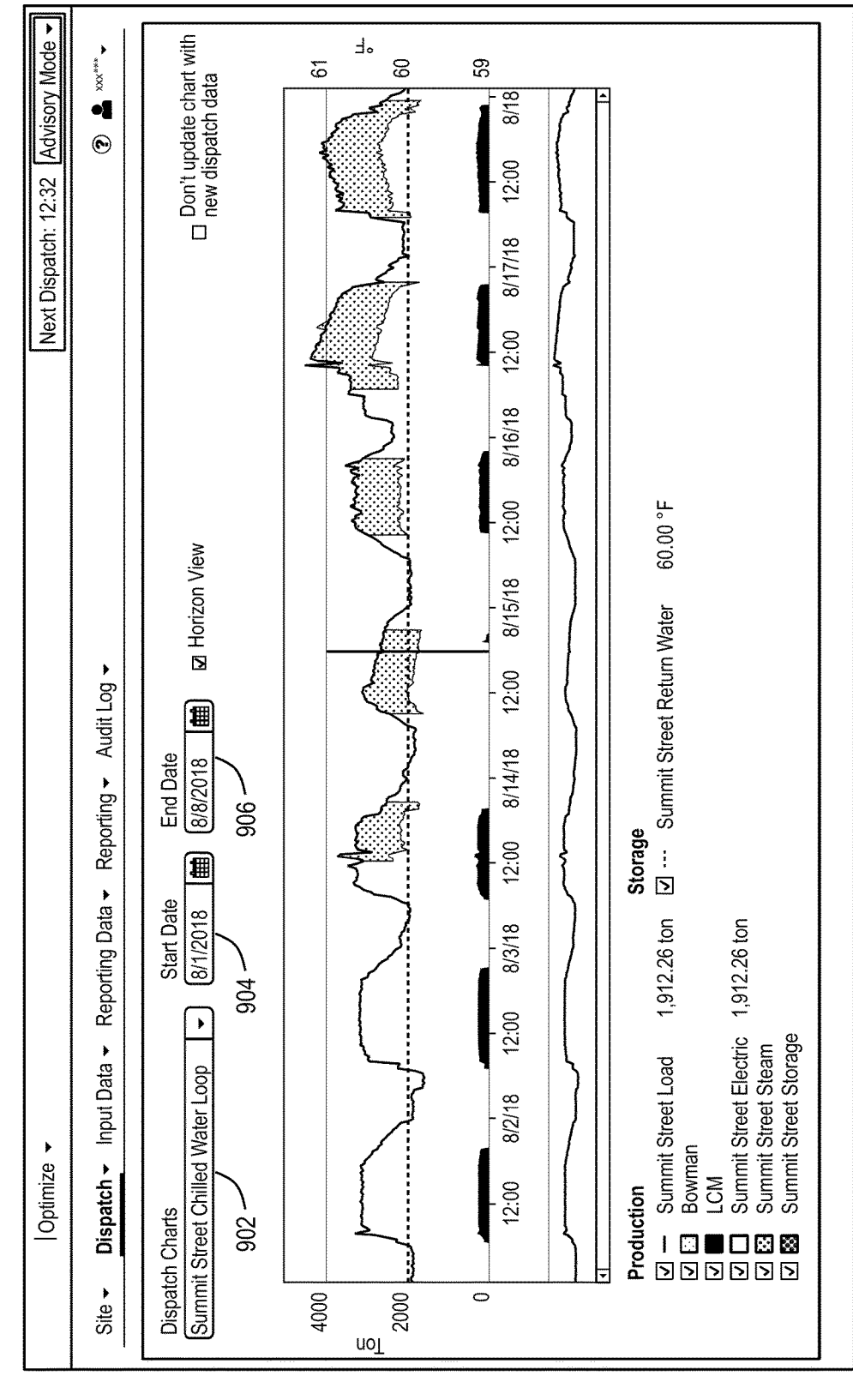
FIG. 9 is a graph illustrating the production and storage load schedule across multiple subplants without a user override, according to some embodiments.

Referring now to FIG. 9, an example user interface 900 is shown which illustrates the production and storage load schedule across a plurality of subplants when not subject to an override constraint, according to some embodiments. This example user interface 900 may be presented via the building status monitor 524 or the monitoring and reporting apps 526, which may be implemented on the client device 368, for example. A user may interact with the interface in a number of ways, such as by selecting a chart to view using the dispatch chart menu 902. The user may also enter a start date 904 and end date 906, defining a period over which they would like to view data. The interface also includes production and storage items which may be selected for display. This example user interface 900 allows a user to view asset allocations over a defined time period to monitor subplant and central plant optimizations.

Figure 10:
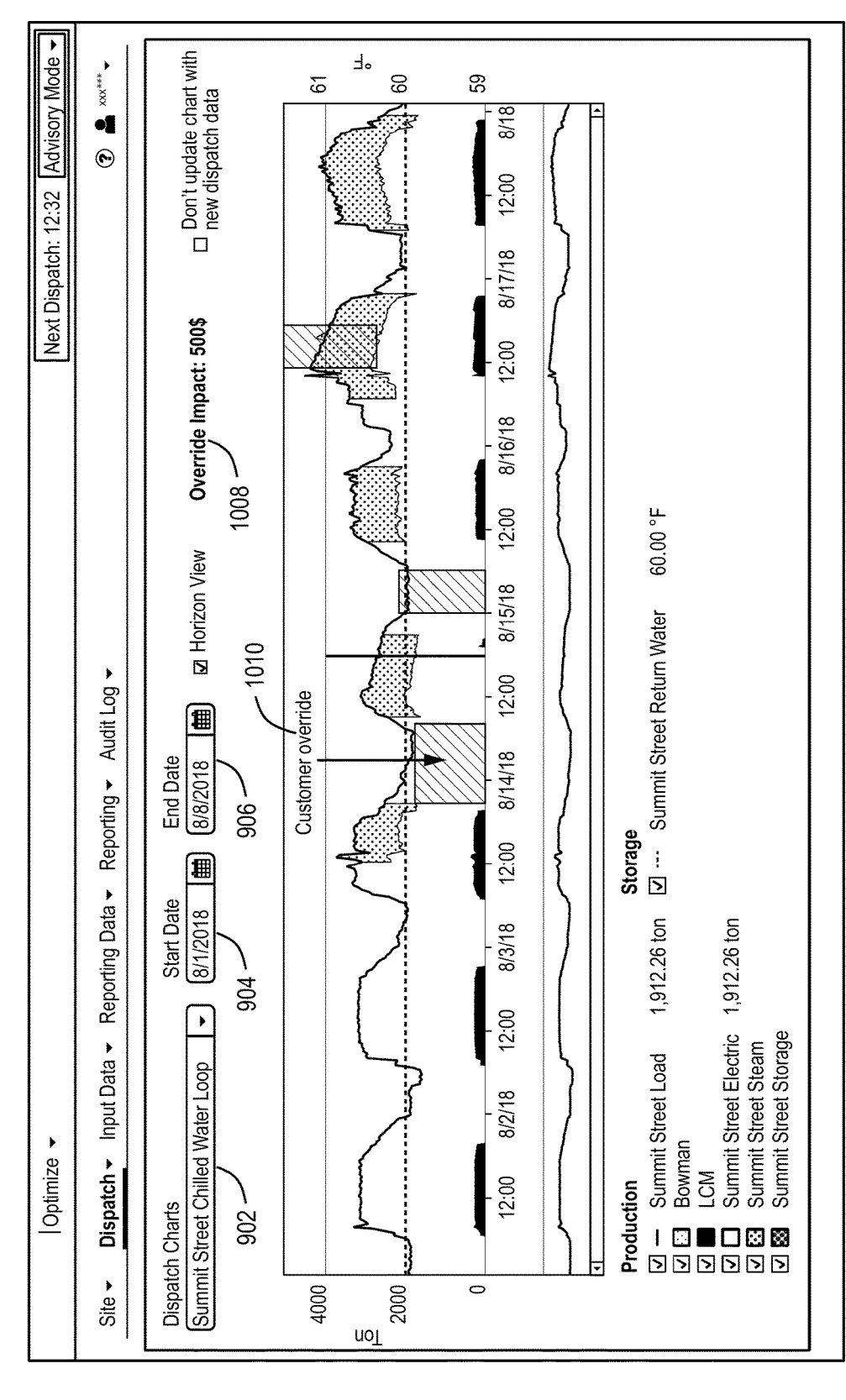
FIG. 10 is a graph illustrating the production and storage load schedule across multiple subplants with a user override and presenting the override cost impact, according to some embodiments.

Referring now to FIG. 10, an example user interface 1000 is shown which illustrates the production and storage load schedule across a plurality of subplants when one or more subplants is subject to an override constraint, according to some embodiments. Similar to the example user interface 900, the example user interface 1000 may be presented via the building status monitor 524 or the monitoring and reporting apps 526, which may be implemented on the client device 368, for example. A user may interact with the interface in a number of ways, such as by selecting a chart to view using the dispatch chart menu 902. The user may also enter a start date 904 and end date 906, defining a period over which they would like to view data. When one or more subplants are subject to an override constraint, an override impact value may be generated as previously disclosed in detail. The override impact may be presented via the example user interface 1000, as shown by the override impact graphic 1008. In this example, the override impact is shown to be a $500 increase over central plant operations that are not subject to an override constraint. Additionally, the example user interface 1000 is shown to include load override graphics 1010, which allow a user to view a load that is subject to an override constraint in relation to the unconstrained loads.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

What is claimed is:

1. A controller for building equipment that operate to consume one or more resources for a building or campus, the controller configured to determine values for a plurality of decision variables indicating an amount of each resource to obtain from a respective source subject to an override constraint for consumption by the building equipment, wherein the override constraint defines one or more of the values for a subset of the plurality of decision variables and the controller determines a remainder of the values for a remainder of the plurality of decision variables using the override constraint, and wherein the controller is configured control the building equipment to consume the amount of the each resource.

2. The controller of claim 1, wherein:

a first subset of the building equipment and a second subset of the building equipment both operate to produce or consume a first resource and contribute toward a total amount of the first resource required by the building or campus; and an optimization is performed subject to both the override constraint and a second constraint that defines the total amount of the first resource required by the building or campus.

3. The controller of claim 2, wherein performing the optimization subject to both the override constraint and the second constraint comprises determining a second amount of the first resource to be produced or consumed by the second subset of the building equipment based on a difference between the total amount of the first resource required by the building or campus and an override amount of the first resource to be produced or consumed by the first subset of the building equipment.

4. The controller of claim 1, wherein:

an objective function defines a total cost of operating the building equipment over a time period; and optimizing the objective function comprises determining amounts of the one or more resources to be produced or consumed by the building equipment that optimize the total cost.

5. The controller of claim 1, wherein:

an objective function defines a total resource production or consumption of the building equipment over a time period; and optimizing the objective function comprises determining amounts of the one or more resources to be produced or consumed by the building equipment that optimize the total resource production or consumption.

6. The controller of claim 1, wherein an optimization of an objective function subject to the override constraint is a first optimization and a processing circuit is configured to:

perform a second optimization of the objective function without the override constraint;

calculate a difference between a first amount of resource production or consumption or cost resulting from the first optimization and a second amount of resource production or consumption or cost resulting from the second optimization; and present, via a user interface, an override impact indicating the difference between the first amount and the second amount.

7. The controller of claim 6, wherein the controller is configured to:

present, via the user interface, an option for a user to select whether to use the override constraint in view of the override impact;

control the building equipment in accordance with a result of the first optimization in response to the user selecting to use the override constraint; and control the building equipment in accordance with a result of the second optimization in response to the user selecting to not use the override constraint.

8. The controller of claim 1, wherein the override constraint requires at least one of:

an amount of a first resource produced or consumed by a first subset of building equipment to be equal to an override amount; or a difference between the amount of the first resource produced or consumed by the first subset of building equipment and the override amount to be less than a threshold value.

9. A method of operating building equipment, the method comprising:

providing an override constraint based on a user input;

determining values for a plurality of decision variables indicating an optimal amount of each resource to purchase from sources and to be consumed by the building equipment subject to the override constraint, wherein the override constraint defines one or more of the values for a subset of the plurality of decision variables and a remainder of the values for a remainder of the plurality of decision variables are determined using the override constraint; and controlling the building equipment to consume the optimal amount of at least one resource.

10. The method of claim 9, wherein:

a first subset of the building equipment and a second subset of the building equipment both operate to produce or consume a first resource and contribute toward a total amount of the first resource required by a building or campus; and an optimization is performed subject to both the override constraint and a second constraint that defines the total amount of the first resource required by the building or campus.

11. The method of claim 10, further comprising:

performing an optimization subject to both the override constraint and the second constraint comprises determining a second amount of the first resource to be produced or consumed by the second subset of the building equipment based on a difference between the total amount of the first resource required by the building or campus and an override amount of the first resource to be produced or consumed by the first subset of the building equipment.

12. The method of claim 9, wherein:

an objective function defines a total cost of operating the building equipment over a time period; and optimizing the objective function comprises determining amounts of the at least one resource to be produced or consumed by the building equipment that optimize the total cost.

13. The method of claim 9, wherein:

an objective function defines a total resource production or consumption of the building equipment over a time period; and optimizing the objective function comprises determining amounts of the at least one resource to be produced or consumed by the building equipment that optimize the total resource production or consumption.

14. The method of claim 9, wherein an optimization of an objective function subject to the override constraint is a first optimization, the method further comprising:

performing a second optimization of the objective function without the override constraint;

calculating a difference between a first amount of resource production or consumption or cost resulting from the first optimization and a second amount of resource production or consumption or cost resulting from the second optimization; and presenting, via a user interface, an override impact indicating the difference between the first amount and the second amount.

15. The method of claim 14, further comprising:

presenting, via the user interface, an option for a user to select whether to use the override constraint in view of the override impact;

controlling the building equipment in accordance with a result of the first optimization in response to the user selecting to use the override constraint; and controlling the building equipment in accordance with a result of the second optimization in response to the user selecting to not use the override constraint.

16. The method of claim 9, wherein the override constraint requires at least one of:

an amount of a first resource produced or consumed by a first subset of building equipment to be equal to an override amount; or a difference between the amount of the first resource produced or consumed by the first subset of building equipment and the override amount to be less than a threshold value.

17. A controller for building equipment that operate to produce or consume one or more resources for a building or campus, the controller comprising a processing circuit configured to:

perform a first optimization of an objective function to determine first values for a plurality of decision variables indicating first amounts of one or more resources to be obtained from a respective source as a result of the first optimization;

receive a user input specifying an override amount of a first resource of the one or more resources to be obtained from the respective source;

perform a second optimization of the objective function, subject to an override constraint based on the user input, to determine second values for the plurality of decision variables indicating second amounts of the one or more resources to be obtained from the respective source as a result of the second optimization, wherein the override constraint defines one or more of the second values for a subset of the plurality of decision variables and the second optimization determines a remainder of the second values for a remainder of the plurality of decision variables using the override constraint; and control the building equipment in accordance with the result of the first optimization or the result of the second optimization.

18. The controller of claim 17, wherein the processing circuit is configured to:

calculate a difference between a first amount of resource production or consumption or cost resulting from the first optimization and a second amount of resource production or consumption or cost resulting from the second optimization; and present, via a user interface, an override impact indicating the difference between the first amount and the second amount.

19. The controller of claim 18, wherein the processing circuit is configured to:

present, via the user interface, an option for a user to select whether to use the override constraint in view of the override impact;

control the building equipment in accordance with the result of the first optimization in response to the user selecting to not use the override constraint; and control the building equipment in accordance with the result of the second optimization in response to the user selecting to use the override constraint.

20. The controller of claim 17, wherein:

a first subset of the building equipment and a second subset of the building equipment both operate to produce or consume the first resource and contribute toward a total amount of the first resource required by the building or campus;

the second optimization is performed subject to both the override constraint and a second constraint that defines the total amount of the first resource required by the building or campus; and performing the second optimization subject to both the override constraint and the second constraint comprises determining a second amount of the first resource to be produced or consumed by the second subset of the building equipment based on a difference between the total amount of the first resource required by the building or campus and the override amount of the first resource to be obtained from the respective source.

* * * * *